US011785518B2

(12) United States Patent
Lei et al.

(10) Patent No.: US 11,785,518 B2
(45) Date of Patent: Oct. 10, 2023

(54) TECHNIQUES FOR ON-DEMAND TRANSMISSION OF DEDICATED REDUCED-BANDWIDTH SYSTEM INFORMATION

(71) Applicant: QUALCOMM Incorporated, San Diego, CA (US)

(72) Inventors: Jing Lei, San Diego, CA (US); Linhai He, San Diego, CA (US); Yongjun Kwak, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 17/466,972

(22) Filed: Sep. 3, 2021

(65) Prior Publication Data

US 2022/0104094 A1   Mar. 31, 2022

Related U.S. Application Data

(60) Provisional application No. 63/084,544, filed on Sep. 28, 2020.

(51) Int. Cl.
*H04W 36/24* (2009.01)
*H04W 48/10* (2009.01)
*H04W 48/02* (2009.01)

(52) U.S. Cl.
CPC ........... *H04W 36/24* (2013.01); *H04W 48/02* (2013.01); *H04W 48/10* (2013.01)

(58) Field of Classification Search
None
See application file for complete search history.

(56) References Cited

U.S. PATENT DOCUMENTS

| 9,271,107 B2* | 2/2016 | Yi ........................... H04W 4/70 |
| 2016/0353371 A1* | 12/2016 | Zhang .................. H04W 48/10 |
| 2018/0007733 A1* | 1/2018 | Mochizuki ............ H04W 48/16 |
| 2019/0116547 A1* | 4/2019 | Sano ................. H04W 74/0833 |

(Continued)

FOREIGN PATENT DOCUMENTS

WO   WO-2019150486 A1   8/2019

OTHER PUBLICATIONS

International Search Report and Written Opinion—PCT/US2021/049243—ISA/EPO—dated Dec. 13, 2021 (208415WO).

(Continued)

*Primary Examiner* — Hong S Cho
(74) *Attorney, Agent, or Firm* — Holland & Hart LLP

(57) ABSTRACT

Methods, systems, and devices for wireless communications are described. A user equipment (UE) may be configured to receive a broadcast message from a base station, the broadcast message including an indication pertaining to system information for reduced-capability UEs including UEs with a bandwidth capability below a threshold, the UE being a reduced-capability UE. The UE may determine, based on the indication in the broadcast message, whether system information for reduced-capability UEs is scheduled to be broadcast by the base station. The UE may then obtain the system information for reduced-capability UEs in accordance with the indication in the broadcast message.

25 Claims, 16 Drawing Sheets

(56) References Cited

U.S. PATENT DOCUMENTS

2020/0374840 A1\* 11/2020 Takeda .............. H04W 56/0015

OTHER PUBLICATIONS

Samsung: "Corrections on Paging Design", 3GPP Draft, 3GPP TSG RAN WG1 Meeting AH1801, R1-1800416 Paging, 3rd Generation Partnership Project (3GPP), Mobile Competence Centre, 650, Route Des Lucioles, F-06921 Sophia-Antipolis Cedex, France, vol. RAN WG1, No. Vancouver, Canada, Jan. 22, 2018-Jan. 26, 2018, Jan. 12, 2018, XP051384327, 4 Pages, Retrieved from the Internet: URL: http://www.3gpp.org/ftp/tsg%5Fran/WG1%5FRL1/TSGR1%5FAH/NR%5FAH%5F1801/Docs/ [retrieved on Jan. 12, 2018] pp. 1-3.

\* cited by examiner

TECHNIQUES FOR ON-DEMAND TRANSMISSION OF DEDICATED REDUCED-BANDWIDTH SYSTEM INFORMATION

CROSS REFERENCE

The present Application for Patent claims the benefit of U.S. Provisional Patent Application No. 63/084,544 by LEI et al., entitled "TECHNIQUES FOR ON-DEMAND TRANSMISSION OF DEDICATED REDUCED-BANDWIDTH SYSTEM INFORMATION," filed Sep. 28, 2020, assigned to the assignee hereof, and expressly incorporated by reference herein.

FIELD OF TECHNOLOGY

The following relates to wireless communications, including techniques for on-demand transmission of dedicated reduced-bandwidth system information.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, base stations may be configured to support both regular, full-capability UEs (e.g., full-bandwidth UEs) as well as reduced-capability UEs (e.g., reduced-bandwidth UEs). Due to the reduced bandwidth capabilities, reduced-capability UEs may be unable to receive system information (e.g., master information blocks (MIBs) or system information blocks (SIBs)) which is broadcast by the network using bandwidths receivable by regular, full-capability UEs.

SUMMARY

The described techniques relate to improved methods, systems, devices, and apparatuses that support techniques for on-demand transmission of dedicated reduced-bandwidth system information. Generally, the described techniques provide for signaling which may be used to indicate whether reduced-capability user equipments (UEs) are able to access a particular cell, and whether system information for reduced-capability UEs is scheduled to be broadcast within the respective cell. For example, a reduced-capability UE may receive a broadcast message receivable by reduced-capability UEs from a base station. The broadcast message may include a reduced-bandwidth (RB) synchronization signal block (SSB) (RB-SSB) for reduced-capability UEs. The broadcast message may include an indication as to whether or not reduced-capability UEs are able to access a cell supported by the base station, and an indication as to whether system information for reduced-capability UEs is scheduled to be broadcast by a base station. System information for reduced-capability UEs may include reduced-bandwidth system information blocks (e.g., RB-SIB1, RB-SIB2, RB-SIB3). In some aspects, the indication in the broadcast message may indicate that system information for reduced-capability UEs is currently scheduled for broadcast, meaning that the network is regularly broadcasting system information or that the system information is scheduled to be broadcast due to the request of another UE. The indication may also indicate that system information for reduced-capability UEs is not currently scheduled for broadcast, in which case the reduced-capability UE may request its broadcast. In this regard, the reduced-capability UE may obtain the system information in accordance with the indication in the broadcast message by monitoring for the system information in cases where the system information is scheduled to be broadcast, and by transmitting a request in cases where the system information is scheduled to be broadcast.

A method for wireless communication at a UE is described. The method may include receiving a broadcast message from a base station, the broadcast message including an indication pertaining to system information for reduced-capability UEs including UEs with a bandwidth capability below a threshold, the UE being a reduced-capability UE, determining, based on the indication in the broadcast message, whether system information for reduced-capability UEs is scheduled to be broadcast by the base station, and obtaining the system information for reduced-capability UEs in accordance with the indication in the broadcast message.

An apparatus for wireless communication at a UE is described. The apparatus may include a processor, memory coupled with the processor, and instructions stored in the memory. The instructions may be executable by the processor to cause the apparatus to receive a broadcast message from a base station, the broadcast message including an indication pertaining to system information for reduced-capability UEs including UEs with a bandwidth capability below a threshold, the UE being a reduced-capability UE, determine, based on the indication in the broadcast message, whether system information for reduced-capability UEs is scheduled to be broadcast by the base station, and obtain the system information for reduced-capability UEs in accordance with the indication in the broadcast message.

Another apparatus for wireless communication at a UE is described. The apparatus may include means for receiving a broadcast message from a base station, the broadcast message including an indication pertaining to system information for reduced-capability UEs including UEs with a bandwidth capability below a threshold, the UE being a reduced-capability UE, means for determining, based on the indication in the broadcast message, whether system information for reduced-capability UEs is scheduled to be broadcast by the base station, and means for obtaining the system information for reduced-capability UEs in accordance with the indication in the broadcast message.

A non-transitory computer-readable medium storing code for wireless communication at a UE is described. The code may include instructions executable by a processor to receive a broadcast message from a base station, the broadcast message including an indication pertaining to system information for reduced-capability UEs including UEs with a bandwidth capability below a threshold, the UE being a reduced-capability UE, determine, based on the indication in the broadcast message, whether system information for reduced-capability UEs is scheduled to be broadcast by the base station, and obtain the system information for reduced-capability UEs in accordance with the indication in the broadcast message.

In some examples of the method, apparatuses, and non-transitory computer-readable medium described herein, the broadcast message may be received via a first cell supported by the base station and the method, apparatuses, and non-transitory computer-readable medium may include further operations, features, means, or instructions for determining that reduced-capability UEs may be not allowed to access the first cell based on access control information of the broadcast message, access barring information of the broadcast message, or both, performing a cell reselection procedure with a second cell different from the first cell based on determining that reduced-capability UEs may be not allowed to access the first cell, receiving an additional broadcast message from the base station via the second cell based on performing the cell reselection procedure, the broadcast message including a second indication pertaining to system information for reduced-capability UEs, and obtaining the system information in accordance with the second indication.

In some examples of the method, apparatuses, and non-transitory computer-readable medium described herein, the broadcast message may be received via a first cell supported by the base station and the method, apparatuses, and non-transitory computer-readable medium may include further operations, features, means, or instructions for determining that reduced-capability UEs may be allowed to access the first cell based on access control information of the broadcast message, access barring information of the broadcast message, or both and evaluating a value of one or more bit fields of the indication in the broadcast message, where a first value of a bit field of the one or more bit fields indicates that the system information for reduced-capability UEs may be scheduled to be broadcast by the base station, and where a second value of the bit field of the one or more bit fields indicates that the system information for reduced-capability UEs may be not scheduled to be broadcast by the base station.

Some examples of the method, apparatuses, and non-transitory computer-readable medium described herein may further include operations, features, means, or instructions for determining that the system information may be not scheduled to be broadcast by the base station and that the system information may be requested by reduced-capability UEs based on the indication in the broadcast message, the broadcast message being part of an SSB transmitted within a bandwidth capable of being received by reduced-capability UEs, transmitting, to the base station, a request for the system information based on determining that the system information may be not scheduled to be broadcast and that the system information may be requested by reduced-capability UEs, and receiving the system information from the base station based on transmitting the request.

In some examples of the method, apparatuses, and non-transitory computer-readable medium described herein, receiving the system information may include operations, features, means, or instructions for receiving the system information which may be quasi co-located with an SSB received from the base station, an additional broadcast message received from the base station, or both, where the system information may be received based on transmitting the request via a pre-configured uplink resource associated with one or more beams for broadcasting system information.

Some examples of the method, apparatuses, and non-transitory computer-readable medium described herein may further include operations, features, means, or instructions for determining a set of parameters associated with transmitting the request based on the indication in the broadcast message pertaining to the system information for reduced-capability UEs, where transmitting the request may be based on the determined set of parameters and based on the broadcast message being received within a bandwidth associated with reduced-capability UEs, non-reduced-capability UEs, or both.

In some examples of the method, apparatuses, and non-transitory computer-readable medium described herein, the set of parameters include a set of time resources, a set of frequency resources, a set of sequences, or any combination thereof.

In some examples of the method, apparatuses, and non-transitory computer-readable medium described herein, the request may be transmitted via a physical random access channel (PRACH), a physical uplink control channel (PUCCH), a physical uplink shared channel (PUSCH), or any combination thereof.

In some examples of the method, apparatuses, and non-transitory computer-readable medium described herein, obtaining the system information for reduced-capability UEs may include operations, features, means, or instructions for determining that reduced-capability UEs may be allowed to access the first cell based on the broadcast message; determining that the system information may be scheduled to be broadcast by the base station based on the indication in the broadcast message, the broadcast message being part of an SSB, monitoring for the system information based on determining that the system information may be scheduled to be broadcast, and receiving the system information from the base station based on monitoring for the system information.

Some examples of the method, apparatuses, and non-transitory computer-readable medium described herein may further include operations, features, means, or instructions for transmitting, to the base station, a request for the system information, where the monitoring may be based on transmitting the request and determining that the system information may be scheduled to be broadcast by the base station based on a random access response received in response to the request, a paging message for system information updates for the first cell received in response to the request, or both.

Some examples of the method, apparatuses, and non-transitory computer-readable medium described herein may further include operations, features, means, or instructions for determining a set of resources for receiving the system information based on the indication in the broadcast message, where monitoring for the system information may be performed based on the determined set of resources.

Some examples of the method, apparatuses, and non-transitory computer-readable medium described herein may further include operations, features, means, or instructions for determining a periodicity associated with the system information based on the indication in the broadcast message, where monitoring for the system information may be performed based on the determined periodicity.

Some examples of the method, apparatuses, and non-transitory computer-readable medium described herein may further include operations, features, means, or instructions for receiving, from the base station, a signaling message including a configuration for interpreting the indication in the broadcast message, where determining whether the system information for reduced-capability UEs may be scheduled to be transmitted may be based on receiving the signaling message.

In some examples of the method, apparatuses, and non-transitory computer-readable medium described herein, the broadcast message received from the base station may be mapped to pre-configured communications resources for reduced-capability UEs and determining whether the system information for reduced-capability UEs may be scheduled to be transmitted may be based on receiving the broadcast message mapped to the pre-configured communications resources for reduced-capability UEs.

In some examples of the method, apparatuses, and non-transitory computer-readable medium described herein, the system information for reduced-capability UEs includes a system information block (SIB)1 SIB which may be quasi co-located with a subset of SSB beams used for communications at the base station and the subset of SSB beams may be associated with requests for the system information transmitted to the base station by reduced-capability UEs.

A method for wireless communication at a base station is described. The method may include transmitting a broadcast message to a UE, the broadcast message including an indication pertaining to system information for reduced-capability UEs including UEs with a bandwidth capability below a threshold, the UE being a reduced-capability UE, transmitting the indication to the UE via the broadcast message, the indication being that system information for reduced-capability UEs is not scheduled to be broadcast by the base station, receiving, from the UE, a request for the system information based on transmission of the indication in the broadcast message, and broadcasting the system information based on receiving the request.

An apparatus for wireless communication at a base station is described. The apparatus may include a processor, memory coupled with the processor, and instructions stored in the memory. The instructions may be executable by the processor to cause the apparatus to transmit a broadcast message to a UE, the broadcast message including an indication pertaining to system information for reduced-capability UEs including UEs with a bandwidth capability below a threshold, the UE being a reduced-capability UE, transmit the indication to the UE via the broadcast message, the indication being that system information for reduced-capability UEs is not scheduled to be broadcast by the base station, receive, from the UE, a request for the system information based on transmission of the indication in the broadcast message, and broadcast the system information based on receiving the request.

Another apparatus for wireless communication at a base station is described. The apparatus may include means for transmitting a broadcast message to a UE, the broadcast message including an indication pertaining to system information for reduced-capability UEs including UEs with a bandwidth capability below a threshold, the UE being a reduced-capability UE, means for transmitting the indication to the UE via the broadcast message, the indication being that system information for reduced-capability UEs is not scheduled to be broadcast by the base station, means for receiving, from the UE, a request for the system information based on transmission of the indication in the broadcast message, and means for broadcasting the system information based on receiving the request.

A non-transitory computer-readable medium storing code for wireless communication at a base station is described. The code may include instructions executable by a processor to transmit a broadcast message to a UE, the broadcast message including an indication pertaining to system information for reduced-capability UEs including UEs with a bandwidth capability below a threshold, the UE being a reduced-capability UE, transmit the indication to the UE via the broadcast message, the indication being that system information for reduced-capability UEs is not scheduled to be broadcast by the base station, receive, from the UE, a request for the system information based on transmission of the indication in the broadcast message, and broadcast the system information based on receiving the request.

Some examples of the method, apparatuses, and non-transitory computer-readable medium described herein may further include operations, features, means, or instructions for determining that a quantity of reduced-capability UEs which may be in wireless communication with the base station may be less than a threshold quantity of reduced-capability UEs and refraining from broadcasting the system information based on determining that the quantity of reduced-capability UEs which may be in wireless communication with the base station may be less than the threshold quantity of reduced-capability UEs.

A method for wireless communication at a UE is described. The method may include receiving a broadcast message from a base station, the broadcast message including an indication pertaining to system information for reduced-capability UEs comprising UEs with a bandwidth capability below a threshold, the UE being a reduced-capability UE, determining, based at least in part on the indication in the broadcast message, whether system information for reduced-capability UEs is scheduled to be broadcast by the base station, and obtaining the system information for reduced-capability UEs in accordance with the indication in the broadcast message.

An apparatus for wireless communication at a UE is described. The apparatus may include a processor, memory in electronic communication with the processor, and instructions stored in the memory. The instructions may be executable by the processor to cause the apparatus to receive a broadcast message from a base station, the broadcast message including an indication pertaining to system information for reduced-capability UEs comprising UEs with a bandwidth capability below a threshold, the UE being a reduced-capability UE, determine, based at least in part on the indication in the broadcast message, whether system information for reduced-capability UEs is scheduled to be broadcast by the base station, and obtain the system information for reduced-capability UEs in accordance with the indication in the broadcast message.

Another apparatus for wireless communication at a UE is described. The apparatus may include means for receiving a broadcast message from a base station, the broadcast message including an indication pertaining to system information for reduced-capability UEs comprising UEs with a bandwidth capability below a threshold, the UE being a reduced-capability UE, means for determining, based at least in part on the indication in the broadcast message, whether system information for reduced-capability UEs is scheduled to be broadcast by the base station, and means for obtaining the system information for reduced-capability UEs in accordance with the indication in the broadcast message.

A non-transitory computer-readable medium storing code for wireless communication at a UE is described. The code may include instructions executable by a processor to receive a broadcast message from a base station, the broadcast message including an indication pertaining to system information for reduced-capability UEs comprising UEs with a bandwidth capability below a threshold, the UE being a reduced-capability UE, determine, based at least in part on the indication in the broadcast message, whether system information for reduced-capability UEs is scheduled to be broadcast by the base station, and obtain the system information for reduced-capability UEs in accordance with the indication in the broadcast message.

In some examples of the method, apparatuses, and non-transitory computer-readable medium described herein, evaluating a value of one or more bit fields of the indication in the broadcast message, the broadcast message being part of an SSB, wherein a first value of a bit field of the one or more bit fields indicates that the system information for reduced-capability UEs may be scheduled to be broadcast by the base station, and wherein a second value of the bit field of the one or more bit fields indicates that the system information for reduced-capability UEs may be not scheduled to be broadcast by the base station.

In some examples of the method, apparatuses, and non-transitory computer-readable medium described herein, determining that the system information may be not scheduled to be broadcast by the base station based at least in part on the indication in the broadcast message, the broadcast message being part of an SSB, transmitting, to the base station, a request for the system information based at least in part on determining that the system information may be not scheduled to be broadcast, and receiving the system information from the base station based at least in part on transmitting the request.

Some examples of the method, apparatuses, and non-transitory computer-readable medium described herein may further include operations, features, means, or instructions for determining a set of parameters associated with transmitting the request based at least in part on the indication in the broadcast message, wherein transmitting the request may be based at least in part on the determined set of parameters.

In some examples of the method, apparatuses, and non-transitory computer-readable medium described herein, the set of parameters comprise a set of time resources, a set of frequency resources, or both.

In some examples of the method, apparatuses, and non-transitory computer-readable medium described herein, the set of parameters comprise a time offset associated with transmitting the request, a physical random access channel (PRACH) preamble associated with the request, a set of random access channel (RACH) occasions for transmitting the request, or any combination thereof.

In some examples of the method, apparatuses, and non-transitory computer-readable medium described herein, the request may be transmitted via a PRACH, a physical uplink control channel (PUCCH), a physical uplink shared channel (PUSCH), or any combination thereof.

In some examples of the method, apparatuses, and non-transitory computer-readable medium described herein, determining that the system information may be scheduled to be broadcast by the base station based at least in part on the indication in the broadcast message, the broadcast message being part of an SSB, monitoring for the system information based at least in part on determining that the system information may be scheduled to be broadcast, and receiving the system information from the base station based at least in part on monitoring for the system information.

Some examples of the method, apparatuses, and non-transitory computer-readable medium described herein may further include operations, features, means, or instructions for determining a set of resources for receiving the system information based at least in part on the indication in the broadcast message, wherein monitoring for the system information may be performed based at least in part on the determined set of resources.

Some examples of the method, apparatuses, and non-transitory computer-readable medium described herein may further include operations, features, means, or instructions for determining a periodicity associated with the system information based at least in part on the indication in the broadcast message, wherein monitoring for the system information may be performed based at least in part on the determined periodicity.

Some examples of the method, apparatuses, and non-transitory computer-readable medium described herein may further include operations, features, means, or instructions for receiving, from the base station, a signaling message comprising a configuration for interpreting the indication in the broadcast message, wherein determining whether the system information for reduced-capability UEs may be scheduled to be transmitted may be based at least in part on receiving the signaling message.

In some examples of the method, apparatuses, and non-transitory computer-readable medium described herein, the broadcast message received from the base station may be mapped to pre-configured communications resources for reduced-capability UEs, and determining whether the system information for reduced-capability UEs may be scheduled to be transmitted may be based at least in part on receiving the broadcast message mapped to the pre-configured communications resources for reduced-capability UEs.

In some examples of the method, apparatuses, and non-transitory computer-readable medium described herein, the system information comprises a SIB1.

In some examples of the method, apparatuses, and non-transitory computer-readable medium described herein, transmitting one or more bit fields via the broadcast message, the broadcast message being part of an SSB, wherein a first value of a bit field of the one or more bit fields indicates that the system information for reduced-capability UEs may be scheduled to be broadcast by the base station, and wherein a second value of the bit field of the one or more bit fields indicates that the system information for reduced-capability UEs may be not scheduled to be broadcast by the base station.

A method for wireless communication at a base station is described. The method may include transmitting a broadcast message to a UE, the broadcast message including an indication pertaining to system information for reduced-capability UEs comprising UEs with a bandwidth capability below a threshold, the UE being a reduced-capability UE, transmitting the indication to the UE via the broadcast message, the indication being that system information for reduced-capability UEs is not scheduled to be broadcast by the base station, receiving, from the UE, a request for the system information based at least in part on transmission of the indication in the broadcast message, and broadcasting the system information based at least in part on receiving the request.

An apparatus for wireless communication at a base station is described. The apparatus may include a processor, memory in electronic communication with the processor, and instructions stored in the memory. The instructions may be executable by the processor to cause the apparatus to transmit a broadcast message to a UE, the broadcast message including an indication pertaining to system information for reduced-capability UEs comprising UEs with a bandwidth capability below a threshold, the UE being a reduced-capability UE, transmit the indication to the UE via the broadcast message, the indication being that system information for reduced-capability UEs is not scheduled to be broadcast by the base station, receive, from the UE, a request for the system information based at least in part on transmission of the indication in the broadcast message, and broadcast the system information based at least in part on receiving the request.

Another apparatus for wireless communication at a base station is described. The apparatus may include means for transmitting a broadcast message to a UE, the broadcast message including an indication pertaining to system information for reduced-capability UEs comprising UEs with a bandwidth capability below a threshold, the UE being a reduced-capability UE, means for transmitting the indication to the UE via the broadcast message, the indication being that system information for reduced-capability UEs is not scheduled to be broadcast by the base station, means for receiving, from the UE, a request for the system information based at least in part on transmission of the indication in the broadcast message, and means for broadcasting the system information based at least in part on receiving the request.

A non-transitory computer-readable medium storing code for wireless communication at a base station is described. The code may include instructions executable by a processor to transmit a broadcast message to a UE, the broadcast message including an indication pertaining to system information for reduced-capability UEs comprising UEs with a bandwidth capability below a threshold, the UE being a reduced-capability UE, transmit the indication to the UE via the broadcast message, the indication being that system information for reduced-capability UEs is not scheduled to be broadcast by the base station, receive, from the UE, a request for the system information based at least in part on transmission of the indication in the broadcast message, and broadcast the system information based at least in part on receiving the request.

Some examples of the method, apparatuses, and non-transitory computer-readable medium described herein may further include operations, features, means, or instructions for transmitting, to the UE via the broadcast message, the broadcast message being part of an SSB, an indication of a set of parameters associated with transmitting the request, wherein receiving the request may be based at least in part on the indication of the set of parameters.

In some examples of the method, apparatuses, and non-transitory computer-readable medium described herein, the set of parameters comprise a set of time resources, a set of frequency resources, or both.

In some examples of the method, apparatuses, and non-transitory computer-readable medium described herein, the set of parameters comprise a time offset associated with transmitting the request, a PRACH preamble associated with the request, a set of RACH occasions for transmitting the request, or any combination thereof.

In some examples of the method, apparatuses, and non-transitory computer-readable medium described herein, the request may be received via a PRACH, a PUCCH, a PUSCH, or any combination thereof.

Some examples of the method, apparatuses, and non-transitory computer-readable medium described herein may further include operations, features, means, or instructions for transmitting, to the UE via the broadcast message, an indication of a set of resources usable by the UE for receiving the system information.

Some examples of the method, apparatuses, and non-transitory computer-readable medium described herein may further include operations, features, means, or instructions for transmitting, to the UE via the broadcast message, an indication of a periodicity associated with the system information, wherein transmitting the system information may be based at least in part on transmitting the indication of the periodicity.

Some examples of the method, apparatuses, and non-transitory computer-readable medium described herein may further include operations, features, means, or instructions for transmitting, to the UE, a signaling message comprising a configuration for interpreting the indication in the broadcast message, wherein receiving the request may be based at least in part on transmitting the signaling message.

In some examples of the method, apparatuses, and non-transitory computer-readable medium described herein, the broadcast message transmitted to the UE may be mapped to pre-configured communications resources for reduced-capability UEs, and receiving the request may be based at least in part on transmitting the broadcast message mapped to the pre-configured communications resources for reduced-capability UEs.

In some examples of the method, apparatuses, and non-transitory computer-readable medium described herein, the system information comprises a SIB1.

Some examples of the method, apparatuses, and non-transitory computer-readable medium described herein may further include operations, features, means, or instructions for determining that a quantity of reduced-capability UEs which may be in wireless communication with the base station may be less than a threshold quantity of reduced-capability UEs and refraining from broadcasting the system information based at least in part on determining that the quantity of reduced-capability UEs which may be in wireless communication with the base station may be less than the threshold quantity of reduced-capability UEs.

DETAILED DESCRIPTION

Figure 1:
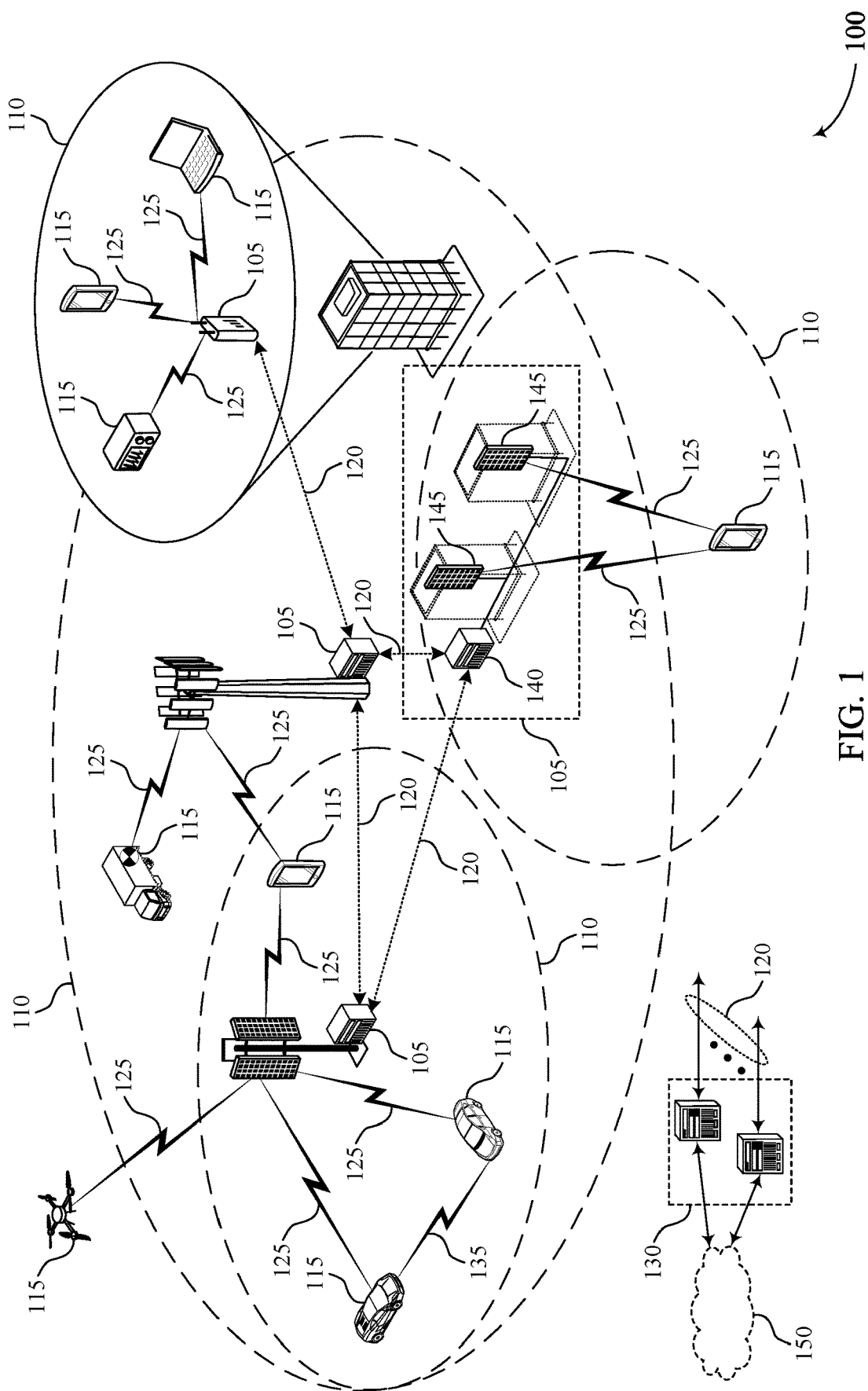
FIG. 1 illustrates an example of a wireless communications system that supports techniques for on-demand transmission of dedicated reduced-bandwidth system information in accordance with aspects of the present disclosure.

In some wireless communications systems, base stations may be configured to support both regular, full-capability user equipments (UEs) (e.g., full-bandwidth UEs) as well as reduced-capability UEs. Reduced-capability UEs may include UEs which include a bandwidth capability below a given threshold, and may thereby include UEs which communicate over a reduced bandwidth (RB) as compared to full-capability UEs. Due to the reduced bandwidth capabilities, reduced-capability UEs may be unable to receive system information (e.g., master information block (MIB), system information block (SIB)) which is broadcast by the network using bandwidths receivable by regular, full-capability UEs. To enable reduced-capability UEs to receive system information, a base station may selectively adjust a bandwidth or other parameters used to transmit the system information such that both full-capability UEs and reduced-capability UEs may be able to receive the same system information. However, broadcasting system information over smaller bandwidths may lead to an inefficient use of resources, and increase power consumption at the base station. Additionally or alternatively, a base station may transmit both regular system information for full-capability UEs, as well as reduced-bandwidth system information for reduced-capability UEs. However, transmitting separate system informations may lead to increased network overhead and resource congestion. Moreover, in cases where there are few or no reduced-capability UEs which require reduced-bandwidth system information, the resources allocated for the reduced-bandwidth system information may be wasted.

Accordingly, techniques for on-demand broadcast of system information for reduced-capability UEs are described. Generally, the described techniques enable a network to transmit broadcast messages for reduced-capability UEs (e.g., reduced bandwidth synchronization signal block (SSB) (RB-SSB)), where the broadcast message includes an indication as to whether reduced-capability UEs are able to access a particular cell, and whether system information for reduced-capability UEs (e.g., RB-SIB1, RB-SIB2, RB-SIB3) is scheduled to be broadcast by the network within the respective cell. Such techniques may enable reduced-capability UEs to obtain system information for reduced-capability UEs in accordance with the indication in the broadcast message.

For example, a reduced-capability UE may receive a broadcast message receivable by reduced-capability UEs from a base station. The broadcast message may include an RB-SSB for reduced-capability UEs. The broadcast message may include an indication as to whether or not reduced-capability UEs are able to access a cell supported by the base station, and an indication as to whether system information for reduced-capability UEs is scheduled to be broadcast by a base station. System information for reduced-capability UEs may include reduced-bandwidth system information blocks (e.g., RB-SIB1, RB-SIB2, RB-SIB3). If reduced-capability UEs are unable to access the cell (as indicated via the broadcast message), the reduced-capability UE may select a new cell which it is able to access such that it may receive system information for reduced-capability UEs. Conversely, if reduced-capability UEs are able to access the cell (as indicated via the broadcast message), the reduced-capability UE may determine whether system information for reduced-capability UEs is scheduled to be broadcast within the cell and/or whether system information for reduced-capability UEs may be requested.

Continuing with the same example, the indication may in the broadcast message may indicate that system information for reduced-capability UEs is currently scheduled for broadcast, meaning that the network is regularly broadcasting system information or that the system information is scheduled to be broadcast due to the request of another UE. The indication may also indicate that system information for reduced-capability UEs is not currently scheduled for broadcast, in which case the reduced-capability UE may request its broadcast. In this regard, the reduced-capability UE may obtain the system information in accordance with the indication in the broadcast message by monitoring for the system information in cases where the system information is scheduled to be broadcast, and by transmitting a request in cases where the system information is scheduled to be broadcast.

In some aspects, the broadcast message (e.g., RB-SSB) may additionally include indications of resources which may be used by the reduced-capability UE to acquire the system information. For example, in cases where the system information is scheduled to be broadcast, the broadcast message may include an indication of a set of resources over which the system information is to be broadcast. Additionally, in cases where the system information is not scheduled to be broadcast, the broadcast message may include an indication of a set of resources over which the reduced-capability UE may use to transmit a request for the system information. The broadcast message may further indicate other parameters associated with transmitting the request, including a time offset, a dedicated physical random access channel (PRACH) preamble for the request, a set of random access channel (RACH) occasions for transmitting the request, and the like.

By signaling whether reduced-capability UEs are able to access a given cell and whether system information for reduced-capability UEs is scheduled to be broadcast by a respective cell, techniques described herein may reduce signaling overhead and lead to a more efficient use of resources. In particular, techniques described herein may enable the network to broadcast system information for reduced-capability UEs only upon request, thereby reducing signaling overhead and preventing a waste of resources in cases where there are few (or no) reduced-capability UEs which are to receive the system information.

Aspects of the disclosure are initially described in the context of wireless communications systems. Additional aspects of the disclosure are described in the context of an example process flow. Aspects of the disclosure are further illustrated by and described with reference to apparatus diagrams, system diagrams, and flowcharts that relate to techniques for on-demand transmission of dedicated reduced-bandwidth system information.

FIG. 1 illustrates an example of a wireless communications system 100 that supports techniques for on-demand transmission of dedicated reduced-bandwidth system information in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be coupled to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some aspects, the UEs 115 and the base stations 105 of the wireless communications system 100 may support techniques for on-demand broadcast of system information for reduced-capability UEs 115. In particular, a base station 105 of the wireless communications system 100 may transmit a broadcast message (e.g., RB-SSB) for reduced-capability UEs, where the broadcast message includes an indication as to whether reduced-capability UEs are able to access a particular cell, and whether system information for reduced-capability UEs 115 (e.g., RB-SIB1, RB-SIB2, RB-SIB3) is scheduled to be broadcast by the base station 105. Such techniques may enable the reduced-capability UE 115 to obtain system information for reduced-capability UEs 115 in accordance with the indication in the broadcast message.

For example, a reduced-capability UE 115 of the wireless communications system 100 may receive, from a base station 105, a broadcast message receivable by reduced-capability UEs 115. The broadcast message may include an RB-SSB for reduced-capability UEs 115, and may include an indication as to whether or not reduced-capability UEs are able to access a cell supported by the base station, and an indication as to whether system information for reduced-capability UEs 115 (e.g., RB-SIB1, RB-SIB2, RB-SIB3) is scheduled to be broadcast by a base station. If reduced-capability UEs are unable to access the cell (as indicated via the broadcast message), the reduced-capability UE may select a new cell which it is able to access such that it may receive system information for reduced-capability UEs. Conversely, if reduced-capability UEs are able to access the cell (as indicated via the broadcast message), the reduced-capability UE may determine whether system information for reduced-capability UEs is scheduled to be broadcast within the cell and/or whether system information for reduced-capability UEs may be requested.

Continuing with the same example, the indication may in the broadcast message may indicate that system information for reduced-capability UEs 115 is currently scheduled for broadcast, meaning that the base station 105 is regularly broadcasting system information or that the system information is scheduled to be broadcast due to the request of another UE 115. The indication may also indicate that system information for reduced-capability UEs 115 is not currently scheduled for broadcast, in which case the reduced-capability UE 115 may request its broadcast. In this regard, the reduced-capability UE 115 may obtain the system information in accordance with the indication in the broadcast message by monitoring for the system information in cases where the system information is scheduled to be broadcast, and by transmitting a request in cases where the system information is scheduled to be broadcast.

In some aspects, the broadcast message (e.g., RB-SSB) transmitted by the base station 105 may additionally include indications of resources which may be used by the reduced-capability UE 115 to acquire the system information. For example, in cases where the system information is scheduled to be broadcast, the broadcast message may include an indication of a set of resources over which the system information is to be broadcast. Additionally, in cases where the system information is not scheduled to be broadcast, the broadcast message may include an indication of a set of resources over which the reduced-capability UE 115 may use to transmit a request for the system information. The broadcast message may further indicate other parameters associated with transmitting the request, including a time offset, a dedicated PRACH preamble for the request, a set of RACH occasions for transmitting the request (e.g., dedicated RACH occasion(s)), and the like.

The techniques described herein may provide for on-demand broadcast of system information, which may reduce signaling overhead and lead to a more efficient use of resources within the wireless communications system 100. In particular, techniques described herein may enable a base station 105 of the wireless communications system to indicate to reduced-capability UEs 115 whether reduced-capability UEs 115 are able to access a particular cell, and whether system information is scheduled to be broadcast within the respective cell, and may broadcast system information for reduced-capability UEs 115 upon request. Accordingly, techniques described herein may reduce signaling overhead and prevent a waste of resources in cases where there are few (or no) reduced-capability UEs 115 which are to receive the system information.

Figure 2:
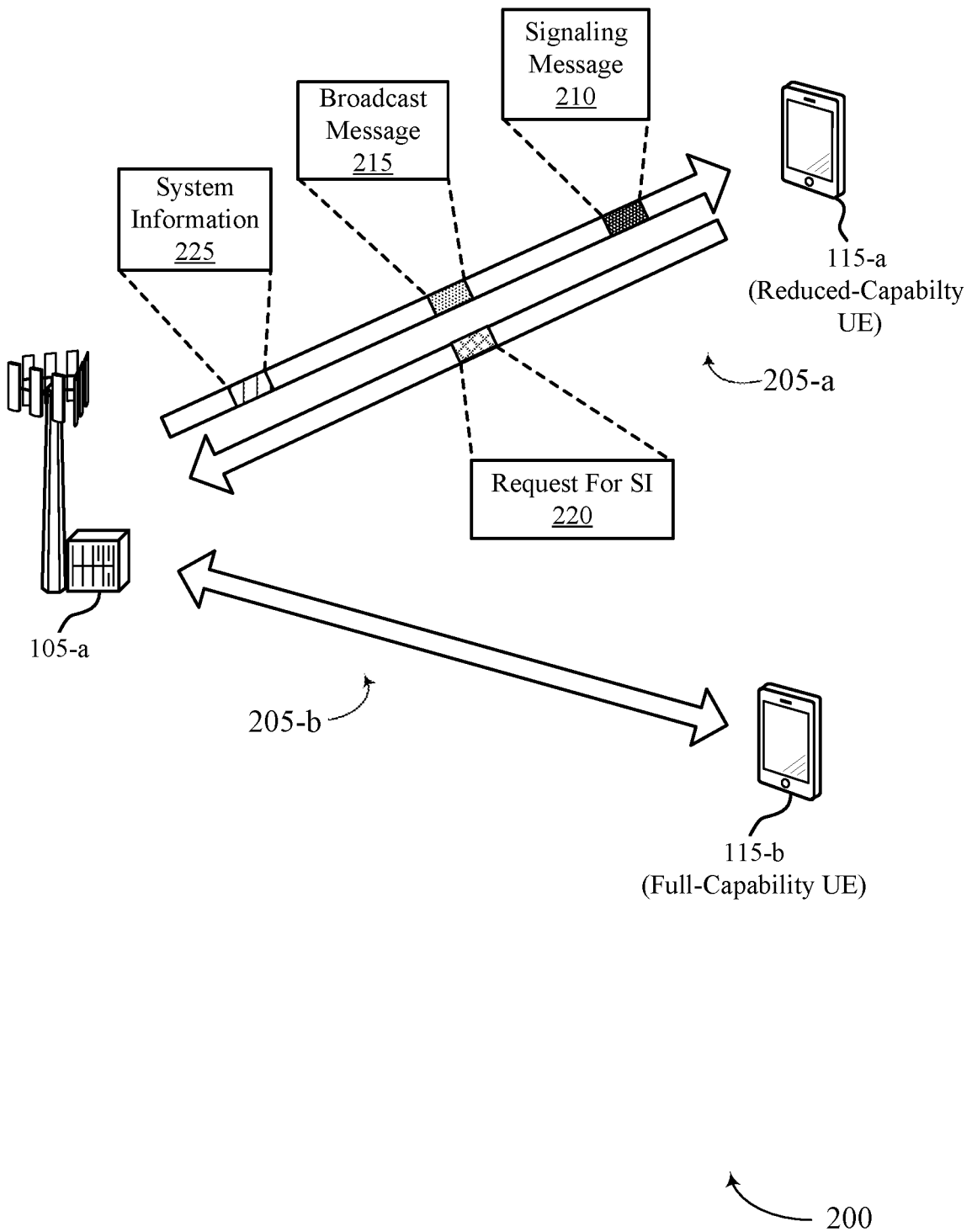
FIG. 2 illustrates an example of a wireless communications system that supports techniques for on-demand transmission of dedicated reduced-bandwidth system information in accordance with aspects of the present disclosure.

FIG. 2 illustrates an example of a wireless communications system 200 that supports techniques for on-demand transmission of dedicated reduced-bandwidth system information in accordance with aspects of the present disclosure. In some examples, wireless communications system 200 may implement aspects of wireless communications system 100. The wireless communications system 200 may include a first UE 115-a (e.g., reduced-capability UE 115-a), a second UE 115-b (e.g., full-capability UE 115-b), and a base station 105-a, which may be examples of UEs 115 and base stations 105, as described with reference to FIG. 1.

In some aspects, the UEs 115-a and 115-b may communicate with the base station 105-a using one or more beams, one or more carriers, one or more communications links, or any combination thereof. For example, the first UE 115-a may communicate with the base station 105-a via a communication link 205-a, and the second UE 115-b may communicate with the base station 105-a via a communication link 205-b. In some aspects, the communication links 205-a and 205-b may include examples of access links (e.g., Uu links). The communication links 205-a and 205-b may include bi-directional links that can include both uplink and downlink communication. For example, the first UE 115-a may transmit uplink transmissions, such as uplink control signals or uplink data signals, to the base station 105-a using the communication link 205-a, and the base station 105-a may transmit downlink transmissions, such as downlink control signals or downlink data signals, to the first UE 115-a using the communication link 205-a. In some aspects, the wireless communications system 200 may support wireless communications with wireless devices (e.g., first UE 115-a, second) via one or more serving cells of the wireless communications system 200. Each serving cell may be supported by one or more base stations 105 of the wireless communications system 200.

As shown in FIG. 2, the base station 105-a of the wireless communications system 200 may be configured to support both regular, full-capability user equipments UEs 115 as well as reduced-capability UEs 115. For example, the second UE 115-b may include an example of a full-capability (e.g., full-bandwidth) UE 115-b, whereas the first UE 115-a may include an example of a reduced-capability (e.g., reduced-bandwidth) UE 115-a. The reduced-capability UE 115-b may exhibit a reduced capability as compared to the full-capability UE 115-a with respect to one or more parameters, including a bandwidth over which it may communicate, processing capabilities, quantities of antennas, or any combination thereof. For instance, in some cases, the first UE 115-a may include a bandwidth capability below a given threshold, and may communicate with the base station 105-a over a reduced bandwidth as compared to full-capability UE 115-a.

In some wireless communications systems, due to the reduced-capability (e.g., reduced bandwidth capability) of the first UE 115-a, the first UE 115-a may be unable to receive system information (e.g., MIB, SIB, SSB) which is broadcast by the base station 105-a using bandwidths receivable by the regular, full-capability UE 115-b. The system information may be obtained by the UEs 115-a and 115-b to perform some communications services or programs, such as gaming applications, video messaging services, and the like. In some wireless communications systems, in order to enable the reduced-capability UE 115-a to receive system information, the base station 105-a may selectively adjust a bandwidth or other parameters used to transmit the system information such that both the full-capability UE 115-b and the reduced-capability UE 115-a may be able to receive the same system information. However, broadcasting system information over smaller bandwidths may lead to an inefficient use of resources, and increase power consumption at the base station 105-a. Additionally or alternatively, the base station 105-a may transmit both regular system information for the full-capability UE 115-a, as well as reduced-bandwidth system information for the reduced-capability UE 115-b. However, transmitting separate system informations may lead to increased network overhead and resource congestion. Moreover, in cases where there are few or no reduced-capability UEs 115 (e.g., first UE 115-a) which require reduced-bandwidth system information, the resources allocated for the reduced-bandwidth system information may be wasted.

Accordingly, the wireless communications system 200 may be configured to enable the base station 105-a to indicate whether reduced-capability UEs 115 are able to access a given cell supported by the base station 105-a and whether system information for reduced-capability UEs 115 is scheduled to be broadcast, and transmit the system information for reduced-capability UEs 115 (e.g., reduced-capability UE 115-a) in response to on-demand requests. Generally, the described techniques enable a network to continuously transmit broadcast messages receivable by reduced-capability UEs 115 (e.g., RB-SSB), where the broadcast message includes an indication as to whether system information for reduced-capability UEs 115 is scheduled to be broadcast. In this regard, the reduced-capability UE 115-a of the wireless communications system 200 may be configured to obtain the system information in accordance with the indication in the broadcast message. Namely, the reduced-capability UE 115-a may be configured to monitor for the system information when the indication in the broadcast message indicates that the system information is scheduled to be broadcast, and may transmit a request for the system information when the indication in the broadcast message indicates that the system information is not scheduled to be broadcast.

For example, the UE 115-a (e.g., reduced-capability UE 115-a) may receive a signaling message 210 from the base station 105-a. In some aspects, the signaling message 210 may indicate a configuration for interpreting information within broadcast messages 215 (e.g., broadcast RB-SSB) transmitted by the base station 105-a. Additionally or alternatively, the signaling message 210 may indicate a set of resources (e.g., time resources, frequency resources, spatial resources) which may be used by the base station 105-a to transmit the broadcast messages 215. The signaling message 210 may be transmitted via a physical downlink control channel (PDCCH), a physical downlink shared channel (PDSCH), or both. For example, the signaling message 210 may include a control message (e.g., RRC message) which is transmitted via a PDCCH.

In some aspects, the UE 115-a may receive a broadcast message 215 from the base station 105-a. The broadcast message may be received via a first cell supported by the base station 105-b. In some aspects, the broadcast message 215 may be configured for (e.g., receivable by) reduced-capability UEs 115 which include a bandwidth capability below a threshold. For example, the broadcast message 215 may include, or be part of, an RB-SSB, an RB-MIB, or both. In some aspects, the broadcast message 215 may include an indication pertaining to system information 225 (e.g., RB-SIB1, RB-SIB2, RB-SIB3) for reduced-capability UEs 115. In some aspects, the UE 115-a may receive the broadcast message 215 based on receiving the signaling message 210.

In some aspects, the signaling message 210 may be used to configure (e.g., pre-configure) the UE 115-a to interpret different values (e.g., bit values, status indicators) of the indication pertaining to system information 225 within the broadcast message 215. In this regard, the UE 115-a may be configured to utilize the information included within the signaling message 210 to interpret the broadcast message 215 and determine whether system information 225 is scheduled to be broadcast, as well as other parameters for the system information 225 (e.g., resources used to monitor for the system information 225, resources used to transmit a request 220 for the system information 225, periodicity of the system information 225). For example, the UE 115-a may receive the signaling message 210 (e.g., RRC message) which indicates a first value of a bit field of the indication pertaining to system information 225 within the broadcast message 215 is associated with a first set of parameters and/or resources for obtaining system information 225, and a second value of a bit field of the indication pertaining to system information 225 within the broadcast message 215 is associated with a second set of parameters and/or resources for obtaining system information 225.

In some aspects, the broadcast message 215 received from the base station 105-b may be mapped to a set of pre-configured communications resources for reduced-capability UEs 115. In this regard, the UE 115-a may be configured to monitor for, receive, and/or interpret the broadcast message 215 based on the broadcast message 215 being mapped to (e.g., transmitted over) pre-configured communications resources for reduced-capability UEs 115. For example, the signaling message 210 may indicate a set of resources (e.g., pre-configured communications resources) associated with reduced-capability UEs 115. Subsequently, the base station 105-a may transmit the broadcast message 215 via the set of resources (e.g., pre-configured communications resources) associated with reduced-capability UEs 115. In this example, the UE 115-a may monitor for and receive the broadcast message 215 based on the broadcast message 215 being mapped to (e.g., transmitted over) the set of resources (e.g., pre-configured communications resources) associated with reduced-capability UEs 115.

The UE 115-a may determine whether reduced-capability UEs 115 are able to access the first cell supported by the base station 105-a. The UE 115-a may determine whether reduced-capability UEs 115 are able to access the first cell based on the broadcast message 215. In particular, the UE 115-a may determine whether reduced-capability UEs 115 are able to access the first cell based on access control information included within the broadcast message 215, based on access barring information included within the broadcast message 214, or both. In some cases, the UE 115-a may determine whether reduced-capability UEs 115 are able to access the first cell based on one or more bit field values included within the broadcast message 215.

In cases where the UE 115-a determines that reduced-capability UEs 115 are unable to access the first cell (e.g., determines that reduced-capability UEs 115 are restricted or barred from accessing the first cell), the UE 115-a may thereby determine that the first cell does not allow reduced-capability UEs 115 to request on-demand transmission of dedicated system information for initial access of reduced-capability UEs 115. In such cases, the UE 115-a may select a new cell. In particular, the UE 115-a may perform a cell reselection procedure with a new cell supported by the base station 105-a (or supported by another base station 105) based on determining that reduced-capability UEs 115 are unable to access the first cell. In this regard, the UE 115-a may initiate cell reselection and monitor broadcast messages of other cells in order to find a cell in which the UE 115-a may receive system information for reduced-capability UEs 115.

For example, upon selecting and attaching to a second cell, the UE 115-a may receive a broadcast message via the second cell, where the broadcast message indicates whether reduced-capability UEs 115 are able to access the second cell, whether the second cell is scheduled to transmit system information for reduced-capability UEs 115, and whether system information for reduced-capability UEs 115 may be received upon request. In cases where the UE 115-a selects a new cell and receives system information via the new cell, the UE 115-*a* may still be said to have obtained the system information "in accordance with" the broadcast message 215 in that the broadcast message 215 indicated that the UE 115-*a* is unable to access the first cell, and therefore was required to select a new cell to receive the system information.

Comparatively, in cases where the UE 115-*a* determines that reduced-capability UEs 115 are able to access the first cell, the UE 115-*a* may continue to evaluate the availability of initial access information for reduced-capability UEs 115. In this regard, in some aspects, the UE 115-*a* may determine whether system information 225 for reduced-capability UEs 115 is scheduled to be broadcast by the base station 105-*a* based on the indication in the broadcast message 215. In particular, the UE 115-*a* may determine whether system information for reduced-capability UEs 115 is scheduled to be broadcast by the base station 105-*a* via the first cell supported by the base station 105-*a*. In this regard, the UE 115-*a* may determine whether system information 225 for reduced-capability UEs 115 is scheduled to be broadcast by the base station 105-*a* based on receiving the signaling message 210, receiving the broadcast message 215, or both. In some cases, the system information 225 may be scheduled to be broadcast in cases where the base station 105-*b* is configured to continuously, regularly, and/or periodically transmit the system information 225. In other cases, the base station 105-*a* may not be configured to continuously, regularly, or periodically transmit the system information 225. However, in such cases, the system information 225 may nonetheless be scheduled to be broadcast in cases where another reduced-capability UE 115 has previously requested transmission of the system information 225.

In some aspects, the indication pertaining to the system information 225 for reduced-capability UEs 115 within the broadcast message 215 may include one or more bit fields. For example, the indication within the broadcast message 215 may include one or more bit fields, where a first value of a bit field of the one or more bit fields (e.g., status indicator of RB-SIB1=1) indicates that the system information 225 for reduced-capability UEs 115 is scheduled to be broadcast by the base station 105-*a*, and a second value of the bit field of the one or more bit fields (e.g., status indicator of RB-SIB1=0) indicates that the system information 225 for reduced-capability UEs 115 is not scheduled to be broadcast by the base station 105-*a*. In some aspects, the UE 115-*b* may be configured to interpret the indication pertaining to the system information 225 (e.g., interpret the one or more bit fields) based on the configuration for interpreting information within broadcast messages 215 which was indicated in the signaling message 210.

In cases where the UE 115-*a* determines that system information 225 for reduced-capability UEs 115 is not scheduled to be broadcast the UE 115-*a* may determine a set of parameters associated with transmitting a request 220 for system information 225. In some aspects, the UE 115-*a* may determine the set of parameters for transmitting the request 220 based on the indication in the broadcast message 215 pertaining to the system information 225 for reduced-capability UEs 115. In this regard, the UE 115-*a* may determine the set of parameters based on receiving the signaling message 210, receiving the broadcast message 215, determining that the system information 225 is not scheduled to be broadcast, or any combination thereof. Additionally or alternatively, the UE 115-*a* may determent the set of parameter for transmitting the request 220 for system information 225 based on the broadcast message 215 (e.g., SSB) being transmitted/received within a bandwidth supported by reduced-capability UEs 115, within a bandwidth supported/shared by reduced-capability UEs 115 and non-reduced-capability UEs 115, or any combination thereof.

In some aspects, the set of parameters associated with transmitting the request 220 may include a set of time resources, a set of frequency resources, a set of spatial resources, or any combination thereof. Additionally or alternatively, the set of parameters may include a channel for transmitting the request 220 (e.g., PRACH, PUCCH, PUSCH), time offset associated with transmitting the request 220, a PRACH preamble associated with the request 220 (e.g., a PRACH preamble for the request), a set of RACH occasions for transmitting the request 220, or any combination thereof. For example, the UE 115-*c* may determine a dedicated preamble or reference signal for requests from reduced-capability UEs 115 for system information associated with reduced-capability UEs 115 (e.g., RB-SIB1). In some aspects, a time offset for transmitting the request may be determined relative to transmission occasions of the broadcast message 215 or some other reference point.

In some aspects, the UE 115-*a* may transmit a request 220 for system information 225 associated with reduced-capability UEs 115 to the base station 105-*a*. In some aspects, the UE 115-*a* may transmit the request 220 based on receiving the signaling message 210, receiving the broadcast message 215, determining that the system information 225 is not scheduled to be broadcast, determining the set of parameters for transmitting the request 220, or any combination thereof. For example, the UE 115-*a* may transmit the request 220 via a channel (e.g., PRACH, PUCCH, PUSCH) indicated in the set of parameters determined for transmitting the request 220. By way of another example, the UE 115-*a* may transmit the request 220 within a RACH occasion and/or using a PRACH preamble indicated in the set of parameters determined for transmitting the request 220.

In this regard, in cases where the base station 105-*a* has not already schedule broadcast of system information 225, the base station 105-*a* may monitor dedicated preambles and/or dedicated resources used for transmissions of requests (e.g., request 220) for system information 225 to determine whether any reduced-capability UE 115 has requested system information 225 for reduced-capability UEs 115. Conversely, in cases where the base station 105-*a* has already scheduled broadcast of system information 225, the base station 105-*b* need not monitor dedicated preambles and/or dedicated resources used for transmissions of requests 220 for system information 225.

In some aspects, the UE 115-*a* may transmit the request 220 via a pre-configured uplink resource associated with one or more beams for broadcasting system information which are used by the base station 105-*a*. That is, the base station 105-*a* may be configured to perform communications using a set of SSB beams which are used for transmissions by the base station 105-*a*, where a subset of SSB beams are associated with requests 220 for on-demand system information 225 received by the base station 105-*a* from reduced-capability UEs 115. In this regard, the UE 115-*a* may transmit the request 220 via a pre-configured uplink resource which is associated with the subset of SSB beams at the base station 105-*a* which are associated with on-demand system information 225.

In some aspects, the base station 105-*a* may transmit a control message (not shown) to the UE 115-*a* based on (e.g., in response to) receiving the request 220. In some cases, the control message may include downlink control information (DCI). In some aspects, the control message may include an acknowledgement of receipt of the request 220. Additionally or alternatively, the control message may include information associated with transmitting or receiving the system information 225 including, but not limited to, a set of resources (e.g., time resources, frequency resources, spatial resources) for transmitting and/or receiving the system information 225, a periodicity of the system information 225, or any combination thereof.

Additionally, or alternatively, after receiving the request 220 for system information 225 via PRACH/PUCCH/PUSCH, the base station 105-*a* may respond to the request 220 by transmitting a sending a random access response (RAR) or paging message, where the RAR and paging message include the scheduling information for on-demand system information 225 requested by reduced-capability UEs 115 (e.g., UE 115-*a*). In other words, the base station 105-*a* may respond to the request 220 by transmitting a RAR or paging message associated with system information updates for the respective cell. Received RARs and/or paging messages may serve as an indication that the base station 105-*a* successfully received the request 220 for system information 225. Moreover, the UE 115-*a* may determine whether system information 225 is scheduled to be broadcast by the base station 105-*a* (e.g., broadcast via the first cell) based on the RAR and/or paging message received in response to the request 220.

In cases where the UE 115-*a* determines that system information 225 for reduced-capability UEs 115 is scheduled to be broadcast, the UE 115-*a* may determine a set of resources for receiving the system information 225. In some aspects, the UE 115-*a* may determine the set of resources for receiving the system information 225 based on the indication pertaining to the system information 225 within the broadcast message 215, based on the control message (not shown) received in response to the request 220, or any combination thereof. In this regard, the UE 115-*a* may determine the set of resources for receiving the system information 225 based on receiving the signaling message 210, receiving the broadcast message 215, determining whether the system information 225 is scheduled to be broadcast, transmitting the request 220, receiving the control message in response to the request 220, or any combination thereof.

In some aspects, the UE 115-*a* may determine a periodicity associated with the system information 225. The periodicity may include a periodicity at which the base station 105-*a* may transmit (e.g., broadcast) the system information 225. In some aspects, the UE 115-*a* may determine the periodicity associated with the system information 225 based on the indication pertaining to the system information 225 within the broadcast message 215, based on the control message received in response to the request 220, or any combination thereof. In some cases, the UE 115-*a* may determine a periodicity of the system information 225 via a periodicity and time-offset indicator for reduced-capability system information 225 which is included within the broadcast message 215. The periodicity and time-offset indicator may include one or more bits (e.g., three bits), where value(s) of the periodicity and time-offset indicator is/are set based on pre-configured rules or LUT. For example, in some cases, if system information for reduced-capability UEs 115 is not scheduled to be broadcast, the periodicity indicator may be set to all zeros (e.g., all "0"s) or all ones (e.g., all "1"s).

In this regard, the UE 115-*a* may determine the set of resources for receiving the system information 225 based on receiving the signaling message 210, receiving the broadcast message 215, determining whether the system information 225 is scheduled to be broadcast, transmitting the request 220, receiving the control message in response to the request 220, determining the set of resources for receiving the system information 225, or any combination thereof.

In some aspects, the UE 115-*a* may monitor for the system information 225. In some aspects, the UE 115-*b* may monitor for the system information 225 based on determining that the system information 225 is scheduled to be broadcast by the base station 105-*a*, based on transmitting the request 220, or both. In this regard, the UE 115-*b* may monitor for the system information 225 based on receiving the signaling message 210, receiving the broadcast message 215, determining whether the system information 225 is scheduled to be broadcast, transmitting the request 220, receiving the control message in response to the request 220, or any combination thereof. Moreover, in some cases, the UE 115-*a* may monitor for the system information 225 based on (e.g., using) the determined set of resources for receiving the system information 225, the determined periodicity of the system information 225, or both.

In some aspects, the UE 115-*a* may obtain (e.g., receive) the system information 225 for reduced-capability UEs 115. In some aspects, system information 225 may include RB-SIB1, RB-SIB2, RB-SIB3, or any combination thereof. The UE 115-*a* may obtain the system information 225 in accordance with the indication pertaining to the system information 225 which was included within the broadcast message 215, in accordance with information included in the control message received in response to the request 220, or any combination thereof. In this regard, the UE 115-*a* may obtain (e.g., receive) the system information 225 for reduced-capability UEs 115 based on receiving the signaling message 210, receiving the broadcast message 215, determining whether the system information 225 is scheduled to be broadcast, transmitting the request 220, receiving the control message in response to the request 220, the determined set of resources for receiving the system information 225, the determined periodicity of the system information 225, monitoring for the system information 225, or any combination thereof.

In some aspects, the system information 225 may be transmitted (e.g., broadcast) via a PBCH, a PDSCH, or both. For example, in some cases, the system information 225 may mapped to (e.g., transmitted via) a set of resources (e.g., pre-configured communications resources) associated with reduced-capability UEs 115.

In some aspects, the system information transmitted/received at 360 may be quasi co-located with other messages/signals which are transmitted by the base station 105. For example, the system information may be quasi co-located with an SSB received from the base station 105-*b* (e.g., SSB associated with the broadcast message at 310), an additional broadcast message received from the base station 105-*b*, or both. In particular, the system information may be quasi co-located with a subset of SSB beams which are used for transmissions by the base station 105-*b*, where the subset of SSB beams are associated with requests for on-demand system information received by the base station 105-*b* from reduced-capability UEs 115. In this regard, the UE 115-*c* may receive the system information based on transmitting the request at 335 via a pre-configured uplink resource associated with one or more beams for broadcasting system information.

By transmitting the system information 225 via beams which are quasi co-located with SSBs and/or other messages performed by the base station 105-*a*, techniques described herein may reduce signaling overhead and power consumption at the base station 105-*a*. in particular, the system information 225 may be transmitted via one or more beams which are associated with a particular location or sector of a given cell, thereby decreasing the quantity of beams that the base station 105-*a* must sweep through in order to broadcast the system information 225. in particular, instead of sweeping through all sixty-four beams, the base station 105-*a* may sweep through only a subset of beams which are associated with a particular location, sector, or other subset of a cell in which the UE 115-*a* is positioned, thereby improving a spectral and energy efficiency within the wireless communications system 200. In such cases, the broadcast message 215, the signaling message 210, the system information 225, and/or other control signaling from the base station 105-*a* may indicate which beam(s) will be used for broadcasting the system information 225.

In some cases, the base station 105-*a* may be configured to determine a quantity of reduced-capability UEs 115 which are communicatively coupled to the base station 105-*a*. The base station 105-*a* may determine the quantity of reduced-capability UEs 115 which are communicatively coupled to the base station 105-*a* in order to determine whether it should continue transmitting (e.g., broadcasting) the system information 225, or if it may end broadcasts of the system information 225. In some aspects, the base station 105-*a* may be configured to refrain from transmitting (e.g., broadcasting) the system information 225 (e.g., end broadcasts of the system information) in cases where the base station 105-*a* determines that a quantity of reduced-capability UEs 115 which are in wireless communications with the base station 105-*a* is less than a threshold quantity of reduced-capability UEs 115. For example, the base station 105-*a* may be configured to refrain from transmitting (e.g., broadcasting) the system information 225 in cases where the base station 105-*a* determines that there are no reduced-capability UEs 115 which are in wireless communications with the base station 105-*a*. Additionally or alternatively, the base station 105-*a* may be configured to refrain from transmitting the system information 225 when the UE 115-*a* which requested the system information 225 is no longer in wireless communications with the base station 105-*a*, after a predetermined time, after a predetermined quantity of broadcasts, or any combination thereof.

The techniques described herein may provide for on-demand broadcast of system information, which may reduce signaling overhead and lead to a more efficient use of resources within the wireless communications system 200. In particular, techniques described herein may enable the base station 105-*a* of the wireless communications system 200 to indicate to reduced-capability UEs 115 (e.g., UE 115-*a*) whether system information 225 is scheduled to be broadcast, and may broadcast system information 225 for reduced-capability UEs 115 upon request. Accordingly, techniques described herein may reduce signaling overhead and prevent a waste of resources in cases where there are few (or no) reduced-capability UEs 115 which are to receive the system information 225.

Figure 3:
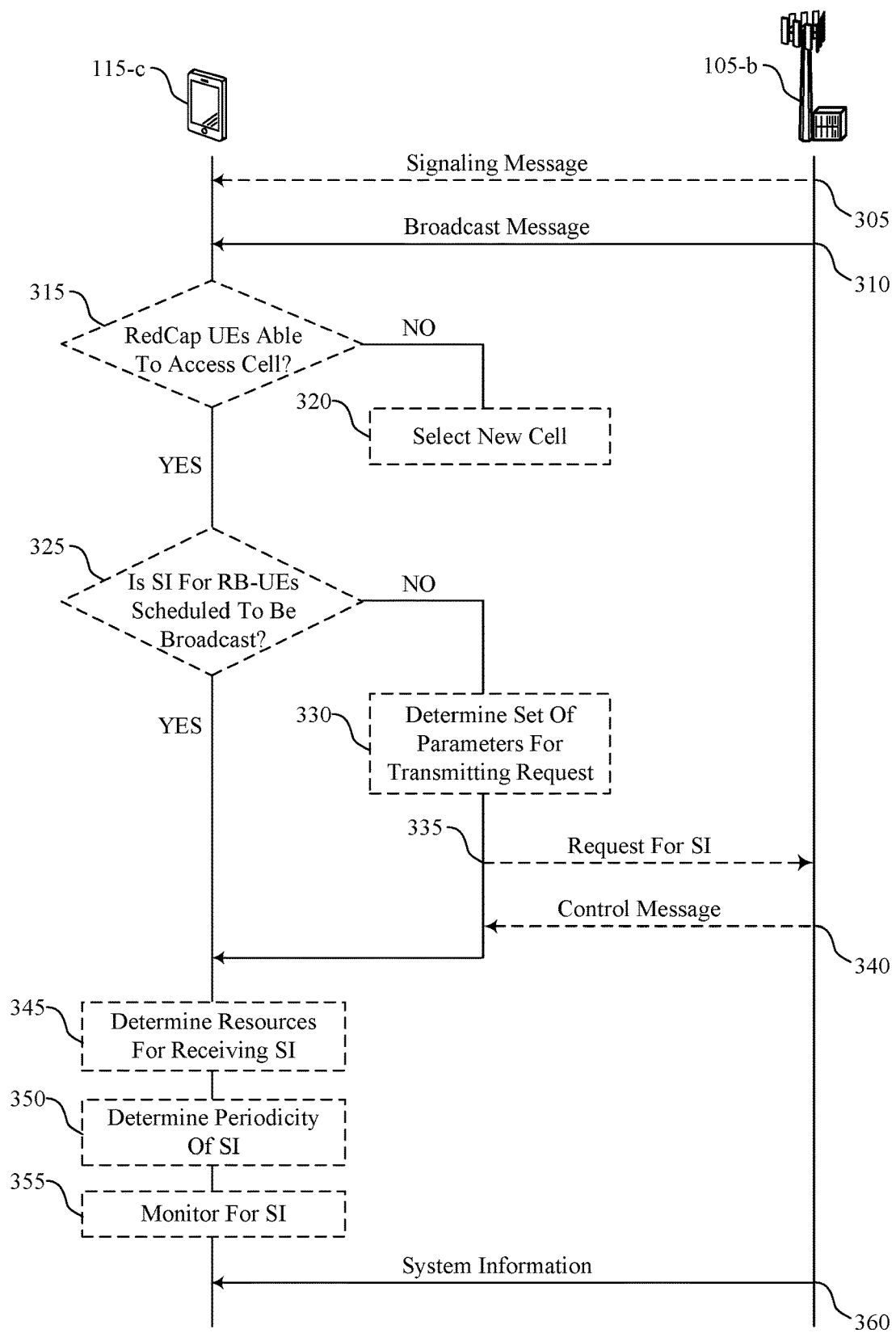
FIG. 3 illustrates an example of a process flow that supports techniques for on-demand transmission of dedicated reduced-bandwidth system information in accordance with aspects of the present disclosure.

FIG. 3 illustrates an example of a process flow 300 that supports techniques for on-demand transmission of dedicated reduced-bandwidth system information in accordance with aspects of the present disclosure. In some examples, process flow 300 may implement, or be implemented by, aspects of wireless communications system 100, wireless communications system 200, or both. For example, the process flow 300 may illustrate a reduced-capability UE 115-*c* receiving a broadcast message (e.g., RB-SSB) from a base station 105-*b*, determining whether system information for reduced-capability UEs 115 is scheduled to be broadcast by the base station 105-*b* based on an indication in the broadcast message, and obtaining the system information in accordance with the indication in the broadcast message, as described with reference to FIGS. 1-2, among other aspects.

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 305, the UE 115-*c* (e.g., reduced-capability UE 115-*c*) may receive a signaling message from the base station 105-*b*. In some aspects, the singling message may indicate a configuration for interpreting information within broadcast messages (e.g., broadcast RB-SSB) transmitted by the base station 105-*b*. Additionally or alternatively, the signaling message may indicate a set of resources (e.g., time resources, frequency resources, spatial resources) which may be used by the base station 105-*b* to transmit the broadcast messages. The signaling message may be transmitted via a PDCCH, a PDSCH, or both. For example, the signaling message may include a control message (e.g., RRC message) which is transmitted via a PDCCH.

At 310, the UE 115-*c* may receive a broadcast message from the base station 105-*b*. The broadcast message may be received via a first cell supported by the base station 105-*b*. In some aspects, the broadcast message may be configured for (e.g., receivable by) reduced-capability UEs 115 which include a bandwidth capability below a threshold. For example, the broadcast message may include, or be part of, an RB-SSB, an RB-MIB, or both. In some aspects, the broadcast message may include an indication pertaining to system information for reduced-capability UEs 115. In some aspects, the UE 115-*c* may receive the broadcast message based on receiving the signaling message at 305.

In some aspects, the broadcast message received from the base station 105-*b* may be mapped to a set of pre-configured communications resources for reduced-capability UEs 115. In this regard, the UE 115-*c* may be configured to monitor for, receive, and/or interpret the broadcast message based on the broadcast message being mapped to (e.g., transmitted over) pre-configured communications resources for reduced-capability UEs 115. For example, the signaling message received at 305 may indicate a set of resources (e.g., pre-configured communications resources) associated with reduced-capability UEs 115. Subsequently, the base station 105-*b* may transmit the broadcast message via the set of resources (e.g., pre-configured communications resources) associated with reduced-capability UEs 115. In this example, the UE 115-*c* may monitor for and receive the broadcast message at 310 based on the broadcast message being mapped to (e.g., transmitted over) the set of resources (e.g., pre-configured communications resources) associated with reduced-capability UEs 115.

At 315, the UE 115-*c* may determine whether reduced-capability UEs 115 are able to access the first cell supported by the base station 105-*b*. The UE 115-*c* may determine whether reduced-capability UEs 115 are able to access the first cell based on the broadcast message received at 310. In particular, the UE 115-*c* may determine whether reduced-capability UEs 115 are able to access the first cell based on access control information included within the broadcast message, based on access barring information included within the broadcast message, or both. In some cases, the UE 115-*c* may determine whether reduced-capability UEs 115 are able to access the first cell based on one or more bit field values included within the broadcast message.

In cases where the UE 115-*c* determines that reduced-capability UEs 115 are unable to access the first cell (e.g., determines that reduced-capability UEs 115 are restricted or barred from accessing the first cell), the UE 115-*c* may thereby determine that the first cell does not allow reduced-capability UEs 115 to request on-demand transmission of dedicated system information for initial access of reduced-capability UEs 115. In such cases, the process flow 300 may proceed to 320.

At 320, the UE 115-*c* may select a new cell. In particular, the UE 115-*c* may perform a cell reselection procedure with a new cell supported by the base station 105-*b* (or supported by another base station 105) based on determining that reduced-capability UEs 115 are unable to access the first cell. In this regard, the UE 115-*c* may initiate cell reselection and monitor broadcast messages of other cells in order to find a cell in which the UE 115-*c* may receive system information for reduced-capability UEs 115.

For example, upon selecting and attaching to a second cell at 320, the UE 115-*c* may receive a broadcast message via the second cell, where the broadcast message indicates whether reduced-capability UEs 115 are able to access the second cell, whether the second cell is scheduled to transmit system information for reduced-capability UEs 115, and whether system information for reduced-capability UEs 115 may be received upon request. In cases where the UE 115-*c* selects a new cell and receives system information via the new cell, the UE 115-*c* may still be said to have obtained the system information "in accordance with" the broadcast message at 310 in that the broadcast message indicated that the UE 115-*c* is unable to access the first cell, and therefore was required to select a new cell to receive the system information.

Reference will again be made to step 315 of process flow 300. In cases where the UE 115-*c* determines that reduced-capability UEs 115 are able to access the first cell, the UE 115-*c* may continue to evaluate the availability of initial access information for reduced-capability UEs 115. In this regard, in cases where the UE 115-*c* determines that reduced-capability UEs 115 are able to access the first cell at 315, the process flow 300 may proceed to 325.

At 325, the UE 115-*c* may determine whether system information for reduced-capability UEs 115 is scheduled to be broadcast by the base station 105-*b* based on the indication in the broadcast message. In particular, the UE 115-*c* may determine whether system information for reduced-capability UEs 115 is scheduled to be broadcast by the base station 105-*b* via the first cell supported by the base station 105-*b*. The UE 115-*c* may determine whether system information for reduced-capability UEs 115 is scheduled to be broadcast by the base station 105-*b* based on receiving the signaling message at 305, receiving the broadcast message at 310, determining that reduced-capability UEs 115 are able to access the first cell at 315, or any combination thereof.

In some aspects, the indication pertaining to the system information for reduced-capability UEs 115 within the broadcast message may include one or more bit fields. For example, the indication within the broadcast message may include one or more bit fields, where a first value of a bit field of the one or more bit fields indicates that the system information for reduced-capability UEs 115 is scheduled to be broadcast by the base station 105-*b*, and a second value of the bit field of the one or more bit fields indicates that the system information for reduced-capability UEs 115 is not scheduled to be broadcast by the base station 105-*b*. In some aspects, the UE 115-*b* may be configured to interpret the indication pertaining to the system information (e.g., the one or more bit fields) based on the configuration for interpreting information within broadcast messages which was indicated in the signaling message received at 305.

In cases where the UE 115-*c* determines that system information for reduced-capability UEs 115 is not scheduled to be broadcast at 325, the process flow 300 may proceed to 330.

At 330, the UE 115-*c* may determine a set of parameters associated with transmitting a request for system information. In some aspects, the UE 115-*c* may determine the set of parameters for transmitting the request based on the indication in the broadcast message pertaining to the system information for reduced-capability UEs 115. In this regard, the UE 115-*c* may determine the set of parameters based on receiving the signaling message at 305, receiving the broadcast message at 310, determining that the system information is not scheduled to be broadcast at 325, or any combination thereof. Additionally, or alternatively, the UE 115-*c* may determent the set of parameter for transmitting the request for system information based on the broadcast message (e.g., SSB) at 310 being transmitted/received within a bandwidth supported by reduced-capability UEs 115, within a bandwidth supported/shared by reduced-capability UEs 115 and non-reduced-capability UEs 115, or any combination thereof.

In some aspects, the set of parameters associated with transmitting the request may include a set of time resources, a set of frequency resources, a set of spatial resources, or any combination thereof. Additionally or alternatively, the set of parameters may include a set of sequences, channel for transmitting the request (e.g., PRACH, PUCCH, PUSCH), time offset associated with transmitting the request, a PRACH preamble associated with the request (e.g., a PRACH preamble for the request), a set of RACH occasions for transmitting the request, or any combination thereof. For example, the UE 115-*c* may determine a dedicated preamble or reference signal for requests from reduced-capability UEs 115 for system information associated with reduced-capability UEs 115 (e.g., RB-SIB1).

At 335, the UE 115-*c* may transmit a request for system information associated with reduced-capability UEs 115 to the base station 105-*b*. In some aspects, the UE 115-*c* may transmit the request based on receiving the signaling message at 305, receiving the broadcast message at 310, determining that the system information is not scheduled to be broadcast at 325, determining the set of parameters for transmitting the request at 330, or any combination thereof. For example, the UE 115-*c* may transmit the request via a channel (e.g., PRACH, PUCCH, PUSCH) indicated in the set of parameters determined at 330. By way of another example, the UE 115-*c* may transmit the request within a RACH occasion and/or using a PRACH preamble indicated in the set of parameters determined at 330.

In this regard, in cases where the base station 105-*b* has not already schedule broadcast of system information, the base station 105-*b* may monitor dedicated preambles and/or dedicated resources used for transmissions of requests for system information (e.g., request at 335) to determine whether any reduced-capability UE 115 has requested system information for reduced-capability UEs 115. Conversely, in cases where the base station 105-*b* has already scheduled broadcast of system information, the base station 105-*b* need not monitor dedicated preambles and/or dedicated resources used for transmissions of requests for system information (e.g., request at 335).

In some aspects, the UE 115-*c* may transmit the request at 335 via a pre-configured uplink resource associated with one or more beams for broadcasting system information which are used by the base station 105-*b*. That is, the base station 105-*b* may be configured to perform communications using a set of SSB beams which are used for transmissions by the base station 105-*b*, where a subset of SSB beams are associated with requests for on-demand system information received by the base station 105-*b* from reduced-capability UEs 115. In this regard, the UE 115-*c* may transmit the request via a pre-configured uplink resource which is associated with the subset of SSB beams at the base station 105-*b* which are associated with on-demand system information.

At 340, the base station 105-*b* may transmit a control message to the UE 115-*c*. In some cases, the control message may include DCI. In some aspects, the base station 105-*b* may transmit the control message based on (e.g., in response to) receiving the request at 335. In some aspects, the control message may include an acknowledgement of receipt of the request. Additionally or alternatively, the control message may include information associated with transmitting or receiving the system information including, but not limited to, a set of resources (e.g., time resources, frequency resources, spatial resources) for transmitting the system information, a periodicity of the system information, or any combination thereof.

Additionally, or alternatively, after receiving the request for system information via PRACH/PUCCH/PUSCH at 335, the base station 105-*b* may respond to the request by transmitting a sending a RAR or paging message, where the RAR and paging message include the scheduling information for on-demand system information requested by reduced-capability UEs 115 (e.g., UE 115-*c*). In other words, the base station 105-*b* may respond to the request by transmitting a RAR or paging message associated with system information updates for the respective cell. Received RARs and/or paging messages may serve as an indication that the base station 105-*b* successfully received the request for system information at 335. Moreover, the UE 115-*c* may determine whether system information is scheduled to be broadcast by the base station 105-*b* (e.g., broadcast via the first cell) based on the RAR and/or paging message received in response to the request.

Reference will again be made to step 325 of process flow 300. In cases where the UE 115-*c* determines that system information for reduced-capability UEs 115 is scheduled to be broadcast at 325 and/or after transmitting the request at 335, the process flow 300 may proceed to 345.

At 345, the UE 115-*c* may determine a set of resources for receiving the system information. In some aspects, the UE 115-*c* may determine the set of resources for receiving the system information based on the indication pertaining to the system information within the broadcast message received at 310, based on the control message received at 340, or any combination thereof. In this regard, the UE 115-*c* may determine the set of resources for receiving the system information based on receiving the signaling message at 305, receiving the broadcast message at 310, determining whether the system information is scheduled to be broadcast at 325, transmitting the request at 335, receiving the control message at 340, or any combination thereof.

At 350, the UE 115-*c* may determine a periodicity associated with the system information. The periodicity may include a periodicity at which the base station 105-*b* may transmit (e.g., broadcast) the system information. In some aspects, the UE 115-*c* may determine the periodicity associated with the system information based on the indication pertaining to the system information within the broadcast message received at 310, based on the control message received at 340, or any combination thereof. In this regard, the UE 115-*c* may determine the set of resources for receiving the system information based on receiving the signaling message at 305, receiving the broadcast message at 310, determining whether the system information is scheduled to be broadcast at 325, transmitting the request at 335, receiving the control message at 340, determining the set of resources for receiving the system information at 345, or any combination thereof.

At 355, the UE 115-*c* may monitor for the system information. In some aspects, the UE 115-*b* may monitor for the system information based on determining that the system information is scheduled to be broadcast by the base station 105-*b* at 325, based on transmitting the request at 335, or both. In this regard, the UE 115-*b* may monitor for the system information based on receiving the signaling message at 305, receiving the broadcast message at 310, determining whether the system information is scheduled to be broadcast at 325, transmitting the request at 335, receiving the control message at 340, or any combination thereof. Moreover, in some cases, the UE 115-*c* may monitor for the system information based on (e.g., using) the set of resources for receiving the system information at 345, determining the periodicity of the system information at 350, or both.

At 360, the UE 115-*c* may obtain (e.g., receive) the system information for reduced-capability UEs 115. In some aspects, system information may include RB-SIB1, RB-SIB2, RB-SIB3, or any combination thereof. The UE 115-*c* may obtain the system information at 360 in accordance with the indication pertaining to the system information which was included within the broadcast message received at 310, in accordance with information included in the control message received at 340, or any combination thereof. In this regard, the UE 115-*c* may obtain (e.g., receive) the system information for reduced-capability UEs 115 based on receiving the signaling message at 305, receiving the broadcast message at 310, determining whether reduced-capability UEs 115 are able to access the first cell at 315, determining whether the system information is scheduled to be broadcast at 325, transmitting the request at 335, receiving the control message at 340, determining the set of resources for receiving the system information at 345, determining the periodicity of the system information at 350, monitoring for the system information at 355, or any combination thereof.

In some aspects, the system information transmitted/received at 360 may be quasi co-located with other messages/signals which are transmitted by the base station 105. For example, the system information may be quasi co-located with an SSB received from the base station 105-*b* (e.g., SSB associated with the broadcast message at 310), an additional broadcast message received from the base station 105-*b*, or both. In particular, the system information may be quasi co-located with a subset of SSB beams which are used for transmissions by the base station 105-*b*, where the subset of SSB beams are associated with requests for on-demand system information received by the base station 105-*b* from reduced-capability UEs 115. In this regard, the UE 115-*c* may receive the system information based on transmitting the request at 335 via a pre-configured uplink resource associated with one or more beams for broadcasting system information.

In some aspects, the system information may be transmitted (e.g., broadcast) via a PBCH, a PDSCH, or both. For example, in some cases, the system information may mapped to (e.g., transmitted via) a set of resources (e.g., pre-configured communications resources) associated with reduced-capability UEs 115.

In some cases, the base station 105-*b* may be configured to determine a quantity of reduced-capability UEs 115 which are communicatively coupled to the base station 105-*b*. The base station 105-*b* may determine the quantity of reduced-capability UEs 115 which are communicatively coupled to the base station 105-*b* in order to determine whether it should continue transmitting (e.g., broadcasting) the system information, or if it may end broadcasts of the system information. In some aspects, the base station 105-*b* may be configured to refrain from transmitting (e.g., broadcasting) the system information (e.g., end broadcasts of the system information) in cases where the base station 105-*b* determines that a quantity of reduced-capability UEs 115 which are in wireless communications with the base station 105-*b* is less than a threshold quantity of reduced-capability UEs 115. For example, the base station 105-*b* may be configured to refrain from transmitting (e.g., broadcasting) the system information in cases where the base station 105-*b* determines that there are no reduced-capability UEs 115 which are in wireless communications with the base station 105-*b*.

In this regard, the base station 105-*b* may stop broadcasting system information for reduced-capability UEs 115 in cases where it determines that there are no reduced-capability UEs 115 in an RRC connected state, or if it determines that a quantity of reduced-capability UEs 115 in an RRC connected state is less than some threshold. Additionally or alternatively, the base station 105-*b* may be configured to refrain from transmitting the system information at 360 when the UE 115-*c* which requested the system information is no longer in wireless communications with the base station 105-*b*, after a predetermined time, after a predetermined quantity of broadcasts, or any combination thereof. Further, if the base station 105-*b* does not receive any request for system information for reduced-capability UEs 115, it may be configured to only periodically broadcast system information for reduced-capability UEs 115 (e.g., periodically broadcast NB-SSB).

The techniques described herein may provide for on-demand broadcast of system information, which may reduce signaling overhead and lead to a more efficient use of resources within a wireless communications system (e.g., wireless communications system 100 or 200). In particular, techniques described herein may enable a base station 105 of the wireless communications system to indicate to reduced-capability UEs 115 whether system information is scheduled to be broadcast, and may broadcast system information for reduced-capability UEs 115 upon request. Accordingly, techniques described herein may reduce signaling overhead and prevent a waste of resources in cases where there are few (or no) reduced-capability UEs 115 which are to receive the system information.

Figure 4:
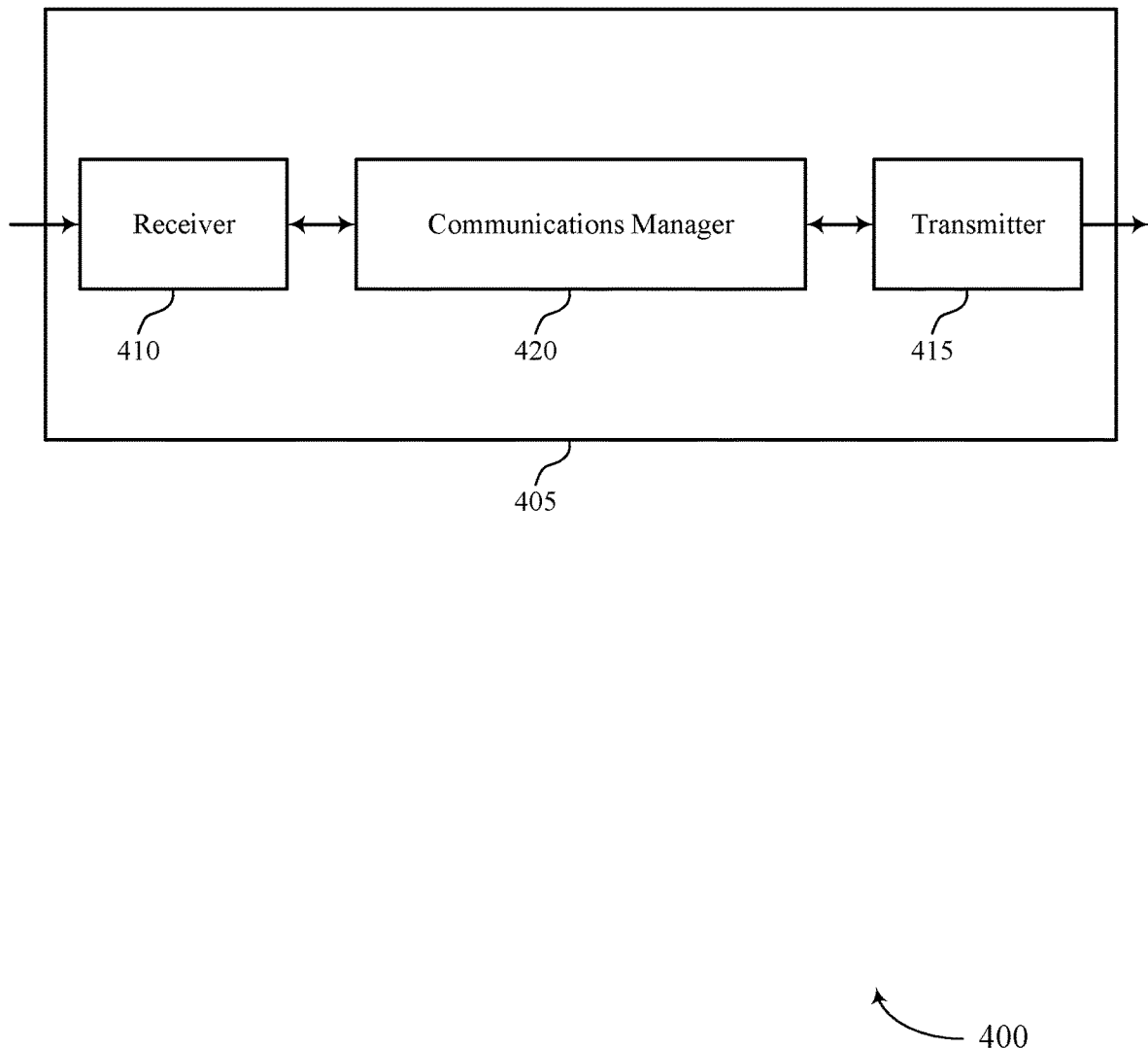
FIGS. 4 and 5 show block diagrams of devices that support techniques for on-demand transmission of dedicated reduced-bandwidth system information in accordance with aspects of the present disclosure.

FIG. 4 shows a block diagram 400 of a device 405 that supports techniques for on-demand transmission of dedicated reduced-bandwidth system information in accordance with aspects of the present disclosure. The device 405 may be an example of aspects of a user equipment (UE) 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for on-demand transmission of dedicated reduced-bandwidth system information). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to size-based neural network selection for autoencoder-based communication). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for on-demand transmission of dedicated reduced-bandwidth system information as described herein.

In some examples, the communications manager 420, the receiver 410, the transmitter 415, or various combinations thereof or components thereof, may be implemented in hardware (e.g., in communications management circuitry). The circuitry may include a processor, a digital signal processor (DSP), an application-specific integrated circuit (ASIC), a field-programmable gate array (FPGA) or other programmable logic device, a discrete gate or transistor logic, discrete hardware components, or any combination thereof designed to perform the functions described in the present disclosure.

Additionally or alternatively, in some examples, the communications manager 420, the receiver 410, the transmitter 415, or various combinations thereof or components thereof, may be implemented in code (e.g., as communications management software or firmware) executed by a processor. If implemented in code executed by a processor, the functions of the communications manager 420, the receiver 410, the transmitter 415, or various combinations thereof or components thereof, may be executed by a general-purpose processor, a DSP, a central processing unit (CPU), an ASIC, an FPGA, or any combination of these or other programmable logic devices.

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured to provide or support a means for receiving a broadcast message from a base station, the broadcast message including an indication pertaining to system information for reduced-capability UEs including UEs with a bandwidth capability below a threshold, the UE being a reduced-capability UE. The communications manager 420 may be configured to provide or support a means for determining, based on the indication in the broadcast message, whether system information for reduced-capability UEs is scheduled to be broadcast by the base station. The communications manager 420 may be configured to provide or support a means for obtaining the system information for reduced-capability UEs in accordance with the indication in the broadcast message.

By including or configuring the communications manager 420 in accordance with examples as described herein, the device 405 (e.g., a processor controlling or otherwise coupled to the receiver 410, the transmitter 415, the communications manager 420, or a combination thereof) may support improved techniques for on-demand broadcasts of system information for reduced-capability UEs 115, which may reduce signaling overhead and lead to more efficient use of resources within a wireless communications system. In particular, techniques described herein may enable the reduced-capability UE 115 to determine whether system information is currently scheduled to be broadcast based on information included within broadcast message, thereby enabling the base station 105 to broadcast the system information for reduced-capability UEs 115 on an as-needed basis, which may reduce signaling overhead and prevent wasted resources in cases where there are few (or no) reduced-capability UEs 115 which are to receive the system information.

Based on obtaining system information for reduced-capability UEs 115 in accordance with information included within a broadcast message, a processor of the UE 115 (e.g., a processor controlling the receiver 410, the communications manager 420, the transmitter 415, etc.) may reduce processing resources used for acquisition of system information. For example, by enabling the UE 115 to efficiently determine whether system information is currently scheduled to be broadcast, techniques described herein may reduce a duration of time in which the UE 115 spends monitoring for system information, which may reduce power consumption and signaling which is associated with monitoring for system information. By reducing the power consumption, battery life of the UE 115 may be improved. Moreover, reducing a duration of time in which the UE 115 spends monitoring for system information may result in faster, more efficient acquisition of system information, leading to improved user experience.

Figure 5:
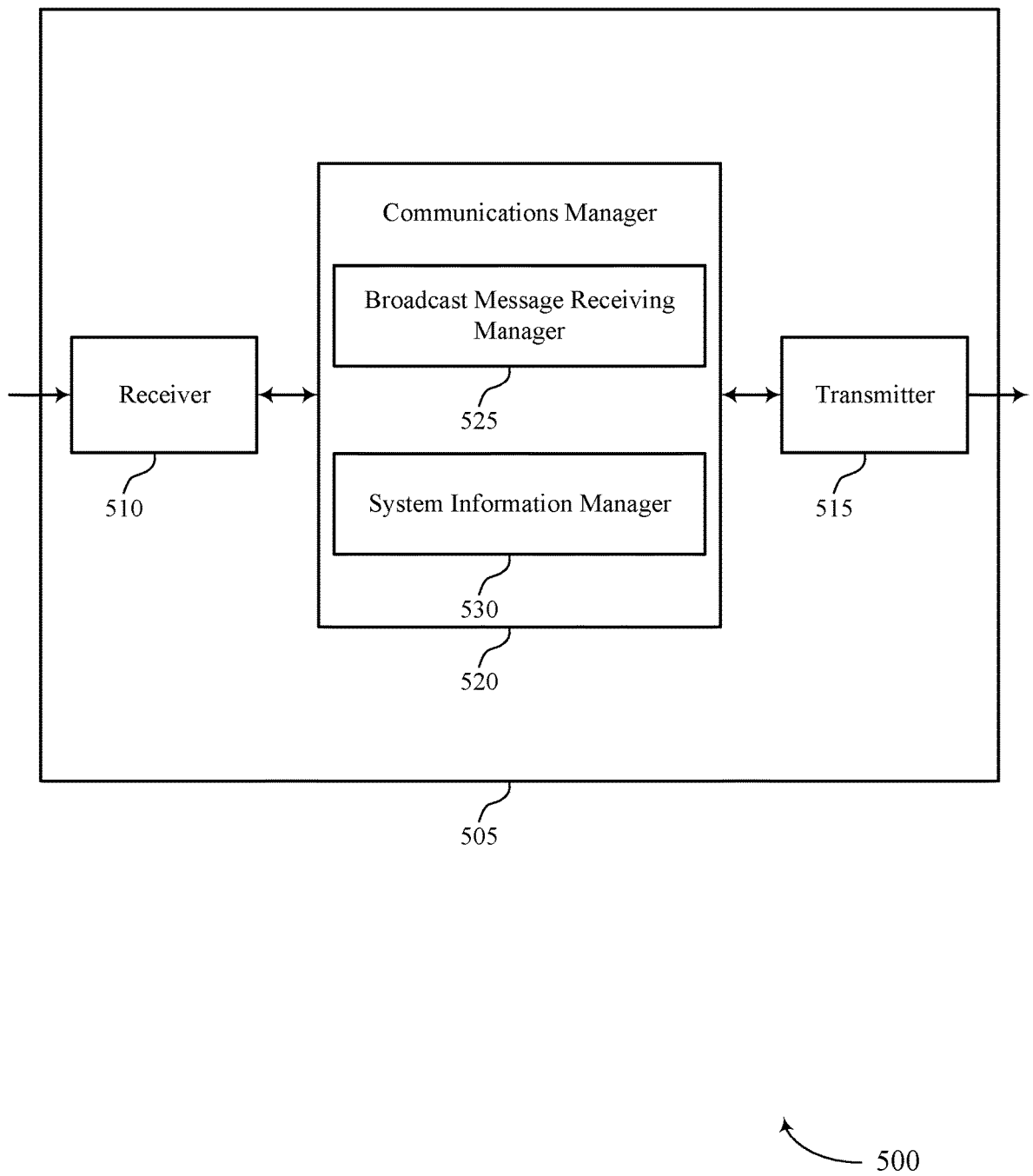

FIG. 5 shows a block diagram 500 of a device 505 that supports techniques for on-demand transmission of dedicated reduced-bandwidth system information in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for on-demand transmission of dedicated reduced-bandwidth system information). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to size-based neural network selection for autoencoder-based communication). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for on-demand transmission of dedicated reduced-bandwidth system information as described herein. For example, the communications manager 520 may include a broadcast message receiving manager 525 a system information manager 530, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The broadcast message receiving manager 525 may be configured to provide or support a means for receiving a broadcast message from a base station, the broadcast message including an indication pertaining to system information for reduced-capability UEs including UEs with a bandwidth capability below a threshold, the UE being a reduced-capability UE. The system information manager 530 may be configured to provide or support a means for determining, based on the indication in the broadcast message, whether system information for reduced-capability UEs is scheduled to be broadcast by the base station. The system information manager 530 may be configured to provide or support a means for obtaining the system information for reduced-capability UEs in accordance with the indication in the broadcast message.

Figure 6:
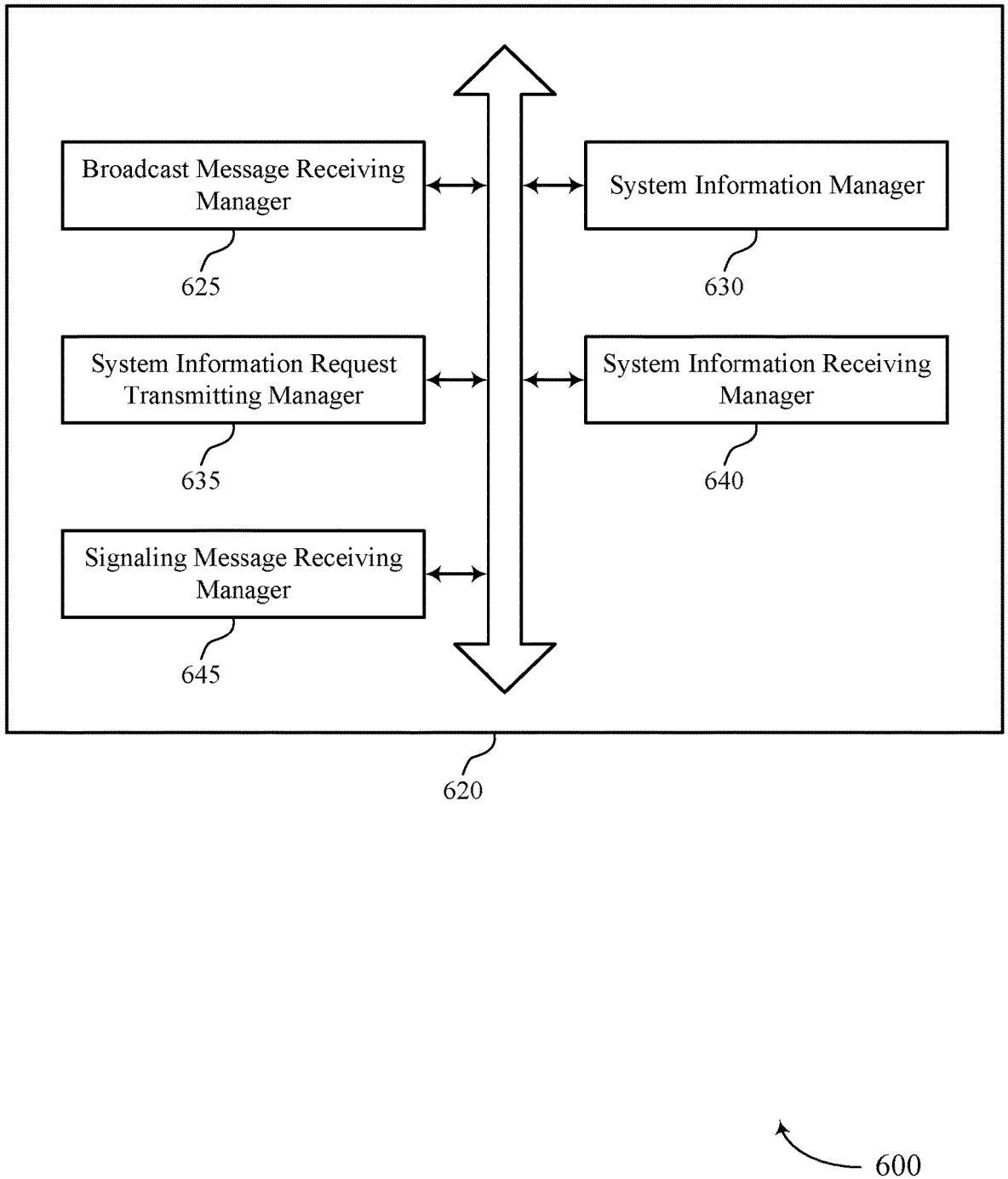
FIG. 6 shows a block diagram of a communications manager that supports techniques for on-demand transmission of dedicated reduced-bandwidth system information in accordance with aspects of the present disclosure.

FIG. 6 shows a block diagram 600 of a communications manager 620 that supports techniques for on-demand transmission of dedicated reduced-bandwidth system information in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for on-demand transmission of dedicated reduced-bandwidth system information as described herein. For example, the communications manager 620 may include a broadcast message receiving manager 625, a system information manager 630, a system information request transmitting manager 635, a system information receiving manager 640, a signaling message receiving manager 645, or any combination thereof. Each of these components may communicate, directly or indirectly, with one another (e.g., via one or more buses).

The communications manager 620 may support wireless communication at a UE in accordance with examples as disclosed herein. The broadcast message receiving manager 625 may be configured to provide or support a means for receiving a broadcast message from a base station, the broadcast message including an indication pertaining to system information for reduced-capability UEs including UEs with a bandwidth capability below a threshold, the UE being a reduced-capability UE. The system information manager 630 may be configured to provide or support a means for determining, based on the indication in the broadcast message, whether system information for reduced-capability UEs is scheduled to be broadcast by the base station. In some examples, the system information manager 630 may be configured to provide or support a means for obtaining the system information for reduced-capability UEs in accordance with the indication in the broadcast message.

In some examples, to support determining whether system information for reduced-capability UEs is scheduled to be broadcast, the broadcast message receiving manager 625 may be configured to provide or support a means for evaluating a value of one or more bit fields of the indication in the broadcast message, the broadcast message being part of an SSB, where a first value of a bit field of the one or more bit fields indicates that the system information for reduced-capability UEs is scheduled to be broadcast by the base station, and where a second value of the bit field of the one or more bit fields indicates that the system information for reduced-capability UEs is not scheduled to be broadcast by the base station.

In some examples, to support obtaining the system information for reduced-capability UEs, the system information manager 630 may be configured to provide or support a means for determining that the system information is not scheduled to be broadcast by the base station based on the indication in the broadcast message, the broadcast message being part of an SSB. In some examples, to support obtaining the system information for reduced-capability UEs, the system information request transmitting manager 635 may be configured to provide or support a means for transmitting, to the base station, a request for the system information based on determining that the system information is not scheduled to be broadcast. In some examples, to support obtaining the system information for reduced-capability UEs, the system information receiving manager 640 may be configured to provide or support a means for receiving the system information from the base station based on transmitting the request.

In some examples, the system information manager 630 may be configured to provide or support a means for determining a set of parameters associated with transmitting the request based on the indication in the broadcast message, where transmitting the request is based on the determined set of parameters. In some examples, the set of parameters include a set of time resources, a set of frequency resources, or both. In some examples, the set of parameters include a time offset associated with transmitting the request, a PRACH preamble associated with the request, a set of RACH occasions for transmitting the request, or any combination thereof. In some examples, the request is transmitted via a PRACH, a PUCCH, a PUSCH, or any combination thereof.

In some examples, to support obtaining the system information for reduced-capability UEs, the system information manager 630 may be configured to provide or support a means for determining that the system information is scheduled to be broadcast by the base station based on the indication in the broadcast message, the broadcast message being part of an SSB. In some examples, to support obtaining the system information for reduced-capability UEs, the system information receiving manager 640 may be configured to provide or support a means for monitoring for the system information based on determining that the system information is scheduled to be broadcast. In some examples, to support obtaining the system information for reduced-capability UEs, the system information receiving manager 640 may be configured to provide or support a means for receiving the system information from the base station based on monitoring for the system information.

In some examples, the system information manager 630 may be configured to provide or support a means for determining a set of resources for receiving the system information based on the indication in the broadcast message, where monitoring for the system information is performed based on the determined set of resources. In some examples, the system information manager 630 may be configured to provide or support a means for determining a periodicity associated with the system information based on the indication in the broadcast message, where monitoring for the system information is performed based on the determined periodicity.

In some examples, the signaling message receiving manager 645 may be configured to provide or support a means for receiving, from the base station, a signaling message including a configuration for interpreting the indication in the broadcast message, where determining whether the system information for reduced-capability UEs is scheduled to be transmitted is based on receiving the signaling message.

In some examples, the broadcast message received from the base station is mapped to pre-configured communications resources for reduced-capability UEs. In some examples, determining whether the system information for reduced-capability UEs is scheduled to be transmitted is based on receiving the broadcast message mapped to the pre-configured communications resources for reduced-capability UEs. In some examples, the system information includes a SIB1

Figure 7:
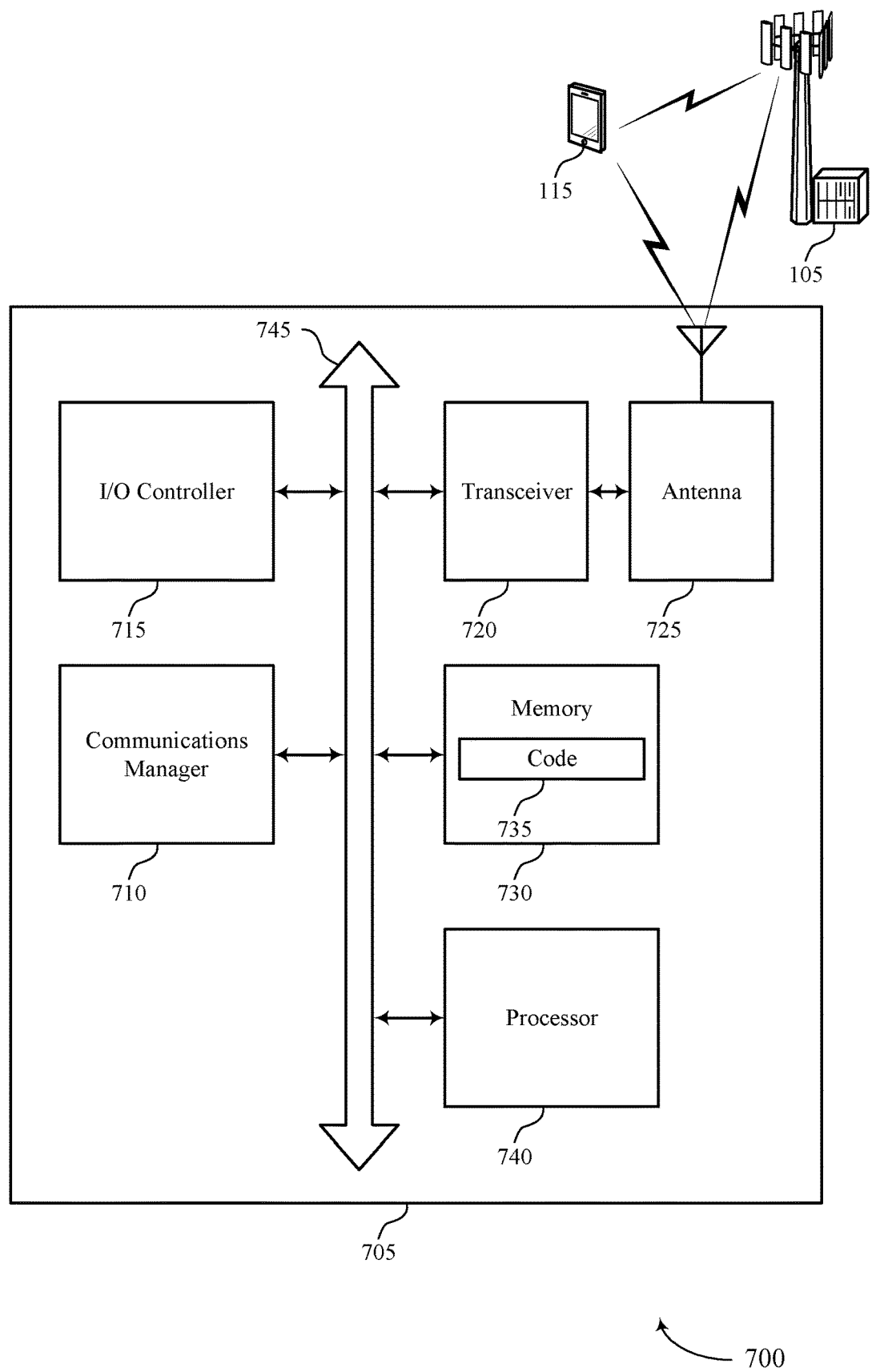
FIG. 7 shows a diagram of a system including a device that supports techniques for on-demand transmission of dedicated reduced-bandwidth system information in accordance with aspects of the present disclosure.

FIG. 7 shows a diagram of a system 700 including a device 705 that supports techniques for on-demand transmission of dedicated reduced-bandwidth system information in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, including a communications manager 710, an I/O controller 715, a transceiver 720, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In some other cases, the I/O controller 715 may represent or interact with a modem, a keyboard, a mouse, a touchscreen, or a similar device. In some cases, the I/O controller 715 may be implemented as part of a processor, such as the processor 740. In some cases, a user may interact with the device 705 via the I/O controller 715 or via hardware components controlled by the I/O controller 715.

In some cases, the device 705 may include a single antenna 725. However, in some other cases the device 705 may have more than one antenna 725, which may be capable of concurrently transmitting or receiving multiple wireless transmissions. The transceiver 720 may communicate bi-directionally, via the one or more antennas 725, wired, or wireless links as described herein. For example, the transceiver 720 may represent a wireless transceiver and may communicate bi-directionally with another wireless transceiver. The transceiver 720 may also include a modem to modulate the packets and provide the modulated packets to one or more antennas 725 for transmission, and to demodulate packets received from the one or more antennas 725. The transceiver 720, or the transceiver 720 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or other type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for on-demand transmission of dedicated reduced-bandwidth system information). For example, the device 705 or a component of the device 705 may include a processor 740 and memory 730 coupled to the processor 740, the processor 740 and memory 730 configured to perform various functions described herein.

The communications manager 710 may support wireless communication at a UE in accordance with examples as disclosed herein. For example, the communications manager 710 may be configured to provide or support a means for receiving a broadcast message from a base station, the broadcast message including an indication pertaining to system information for reduced-capability UEs including UEs with a bandwidth capability below a threshold, the UE being a reduced-capability UE. The communications manager 710 may be configured to provide or support a means for determining, based on the indication in the broadcast message, whether system information for reduced-capability UEs is scheduled to be broadcast by the base station. The communications manager 710 may be configured to provide or support a means for obtaining the system information for reduced-capability UEs in accordance with the indication in the broadcast message.

By including or configuring the communications manager 710 in accordance with examples as described herein, the device 705 may support techniques for on-demand broadcasts of system information for reduced-capability UEs 115, which may reduce signaling overhead and lead to more efficient use of resources within a wireless communications system. In particular, techniques described herein may enable the reduced-capability UE 115 to determine whether system information is currently scheduled to be broadcast based on information included within broadcast message, thereby enabling the base station 105 to broadcast the system information for reduced-capability UEs 115 on an as-needed basis, which may reduce signaling overhead and prevent wasted resources in cases where there are few (or no) reduced-capability UEs 115 which are to receive the system information.

Based on obtaining system information for reduced-capability UEs 115 in accordance with information included within a broadcast message, a processor of the UE 115 may reduce processing resources used for acquisition of system information. For example, by enabling the UE 115 to efficiently determine whether system information is currently scheduled to be broadcast, techniques described herein may reduce a duration of time in which the UE 115 spends monitoring for system information, which may reduce power consumption and signaling which is associated with monitoring for system information. By reducing the power consumption, battery life of the UE 115 may be improved. Moreover, reducing a duration of time in which the UE 115 spends monitoring for system information may result in faster, more efficient acquisition of system information, leading to improved user experience.

In some examples, the communications manager 710 may be configured to perform various operations (e.g., receiving, monitoring, transmitting) using or otherwise in cooperation with the transceiver 720, the one or more antennas 725, or any combination thereof. Although the communications manager 710 is illustrated as a separate component, in some examples, one or more functions described with reference to the communications manager 710 may be supported by or performed by the processor 740, the memory 730, the code 735, or any combination thereof. For example, the code 735 may include instructions executable by the processor 740 to cause the device 705 to perform various aspects of techniques for on-demand transmission of dedicated reduced-bandwidth system information as described herein, or the processor 740 and the memory 730 may be otherwise configured to perform or support such operations.

Figure 8:
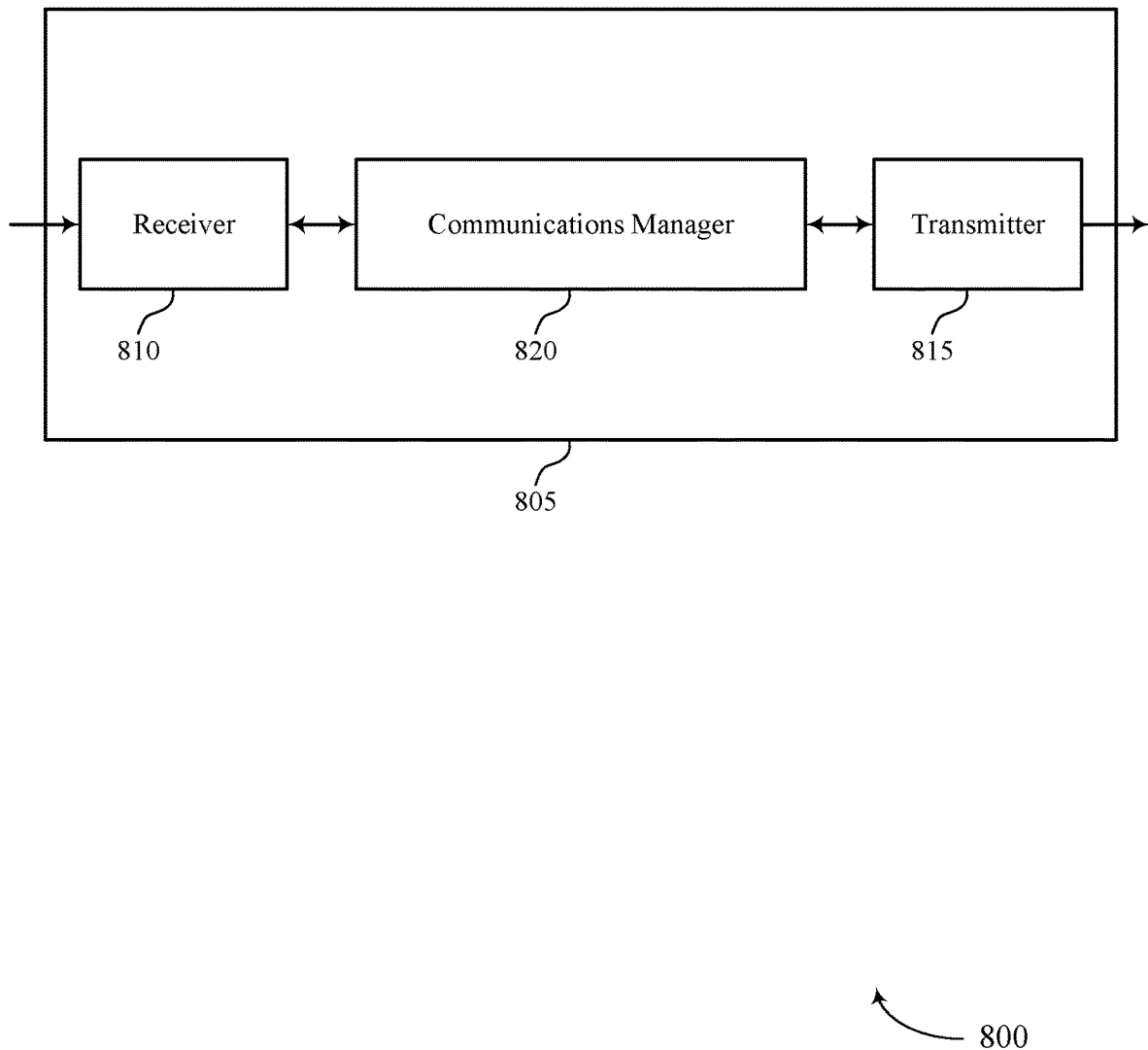
FIGS. 8 and 9 show block diagrams of devices that support techniques for on-demand transmission of dedicated reduced-bandwidth system information in accordance with aspects of the present disclosure.

FIG. 8 shows a block diagram 800 of a device 805 that supports techniques for on-demand transmission of dedicated reduced-bandwidth system information in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for on-demand transmission of dedicated reduced-bandwidth system information). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to size-based neural network selection for autoencoder-based communication). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for on-demand transmission of dedicated reduced-bandwidth system information as described herein.

In some examples, the communications manager 820, the receiver 810, the transmitter 815, or various combinations thereof or components thereof, may be implemented in hardware (e.g., in communications management circuitry). The circuitry may include a processor, an DSP, a ASIC, an FPGA or other programmable logic device, a discrete gate or transistor logic, discrete hardware components, or any combination thereof designed to perform the functions described in the present disclosure.

Additionally or alternatively, in some examples, the communications manager 820, the receiver 810, the transmitter 815, or various combinations thereof or components thereof, may be implemented in code (e.g., as communications management software or firmware) executed by a processor. If implemented in code executed by a processor, the functions of the communications manager 820, the receiver 810, the transmitter 815, or various combinations thereof or components thereof, may be executed by a general-purpose processor, a DSP, a CPU, an ASIC, an FPGA, or any combination of these or other programmable logic devices.

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured to provide or support a means for transmitting a broadcast message to a UE, the broadcast message including an indication pertaining to system information for reduced-capability UEs including UEs with a bandwidth capability below a threshold, the UE being a reduced-capability UE. The communications manager 820 may be configured to provide or support a means for transmitting the indication to the UE via the broadcast message, the indication being that system information for reduced-capability UEs is not scheduled to be broadcast by the base station. The communications manager 820 may be configured to provide or support a means for receiving, from the UE, a request for the system information based on transmission of the indication in the broadcast message. The communications manager 820 may be configured to provide or support a means for broadcasting the system information based on receiving the request.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for on-demand broadcasts of system information for reduced-capability UEs 115, which may reduce signaling overhead and lead to more efficient use of resources within a wireless communications system. In particular, techniques described herein may enable the reduced-capability UE 115 to determine whether system information is currently scheduled to be broadcast based on information included within broadcast message, thereby enabling the base station 105 to broadcast the system information for reduced-capability UEs 115 on an as-needed basis, which may reduce signaling overhead and prevent wasted resources in cases where there are few (or no) reduced-capability UEs 115 which are to receive the system information.

Based on transmitting system information for reduced-capability UEs 115 on an as-needed basis, a processor of the base station 105 may reduce processing resources used for broadcast of system information, which may reduce power consumption and signaling which is associated with transmitting for system information. For example, by enabling the base station 105 to indicate to UEs 115 whether system information is scheduled to be broadcast, techniques described herein may enable the base station 105 to transmit system information for reduced-capability UEs 115 on an as-needed basis, which may reduce power consumption and signaling at the base station 105 which is associated with continuously or regularly broadcasting the system information.

Figure 9:
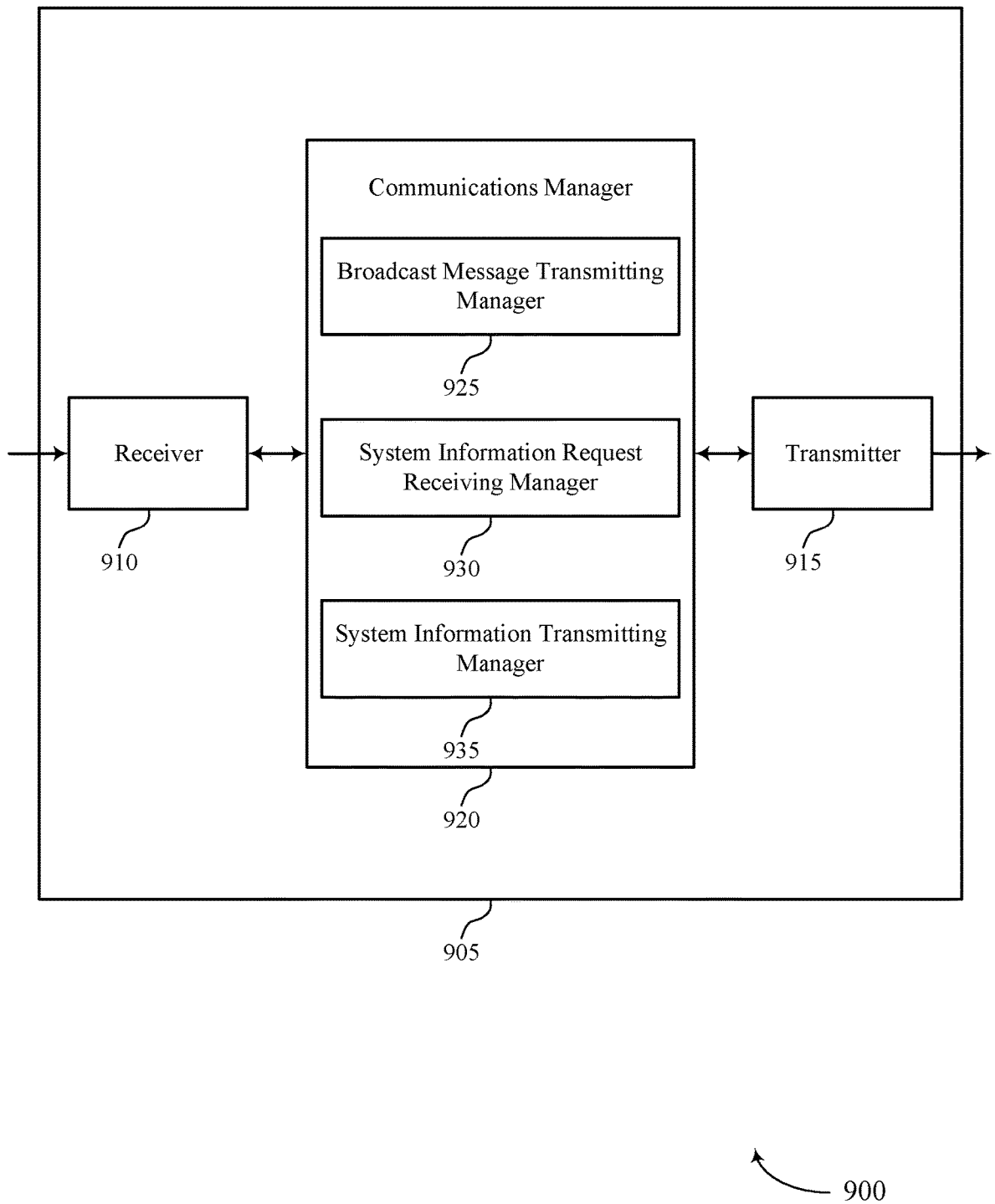

FIG. 9 shows a block diagram 900 of a device 905 that supports techniques for on-demand transmission of dedicated reduced-bandwidth system information in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for on-demand transmission of dedicated reduced-bandwidth system information). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to size-based neural network selection for autoencoder-based communication). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for on-demand transmission of dedicated reduced-bandwidth system information as described herein. For example, the communications manager 920 may include a broadcast message transmitting manager 925, a system information request receiving manager 930, a system information transmitting manager 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The broadcast message transmitting manager 925 may be configured to provide or support a means for transmitting a broadcast message to a UE, the broadcast message including an indication pertaining to system information for reduced-capability UEs including UEs with a bandwidth capability below a threshold, the UE being a reduced-capability UE. The broadcast message transmitting manager 925 may be configured to provide or support a means for transmitting the indication to the UE via the broadcast message, the indication being that system information for reduced-capability UEs is not scheduled to be broadcast by the base station. The system information request receiving manager 930 may be configured to provide or support a means for receiving, from the UE, a request for the system information based on transmission of the indication in the broadcast message. The system information transmitting manager 935 may be configured to provide or support a means for broadcasting the system information based on receiving the request.

Figure 10:
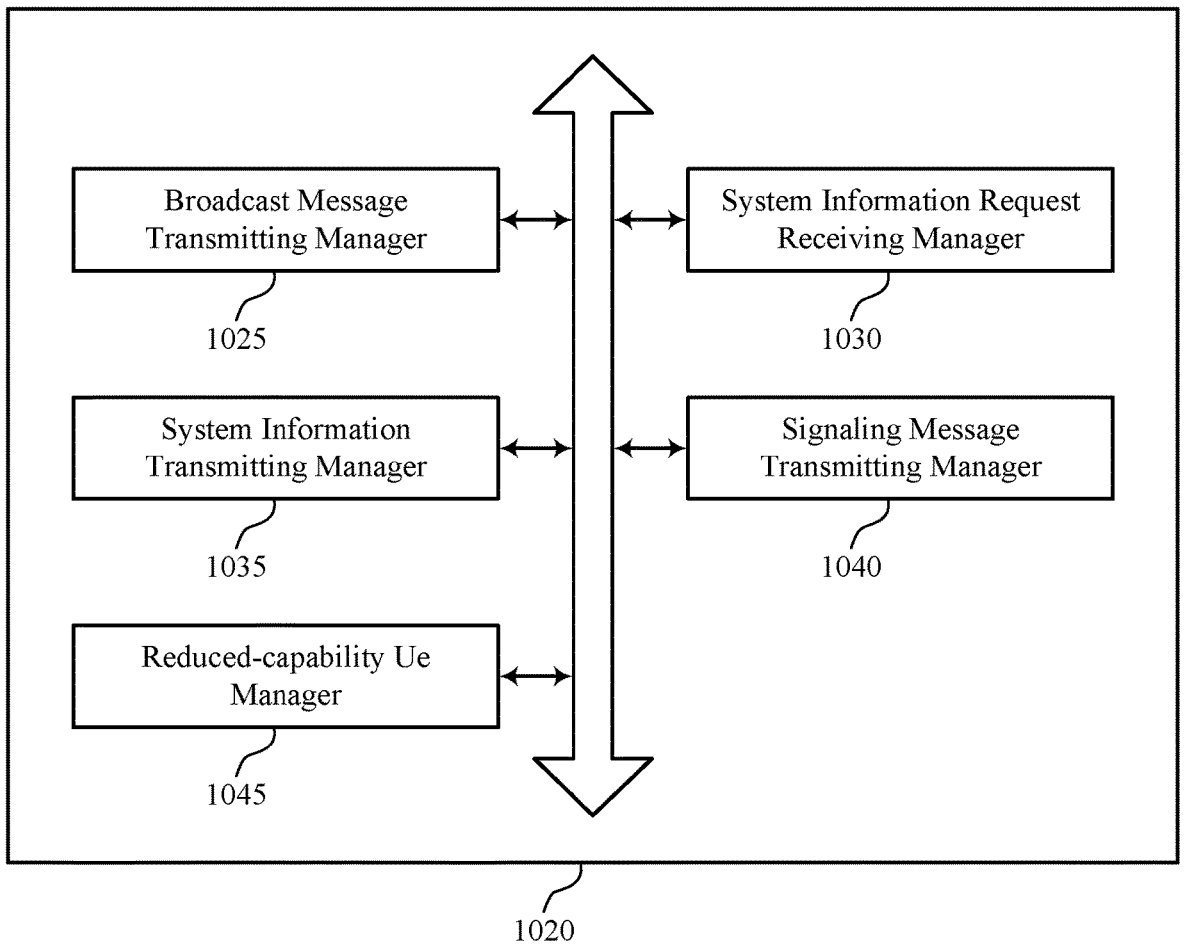
FIG. 10 shows a block diagram of a communications manager that supports techniques for on-demand transmission of dedicated reduced-bandwidth system information in accordance with aspects of the present disclosure.

FIG. 10 shows a block diagram 1000 of a communications manager 1020 that supports techniques for on-demand transmission of dedicated reduced-bandwidth system information in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for on-demand transmission of dedicated reduced-bandwidth system information as described herein. For example, the communications manager 1020 may include a broadcast message transmitting manager 1025, a system information request receiving manager 1030, a system information transmitting manager 1035, a signaling message transmitting manager 1040, a reduced-capability UE manager 1045, or any combination thereof. Each of these components may communicate, directly or indirectly, with one another (e.g., via one or more buses).

The communications manager 1020 may support wireless communication at a base station in accordance with examples as disclosed herein. The broadcast message transmitting manager 1025 may be configured to provide or support a means for transmitting a broadcast message to a UE, the broadcast message including an indication pertaining to system information for reduced-capability UEs including UEs with a bandwidth capability below a threshold, the UE being a reduced-capability UE. In some examples, the broadcast message transmitting manager 1025 may be configured to provide or support a means for transmitting the indication to the UE via the broadcast message, the indication being that system information for reduced-capability UEs is not scheduled to be broadcast by the base station. The system information request receiving manager 1030 may be configured to provide or support a means for receiving, from the UE, a request for the system information based on transmission of the indication in the broadcast message. The system information transmitting manager 1035 may be configured to provide or support a means for broadcasting the system information based on receiving the request.

In some examples, the broadcast message transmitting manager 1025 may be configured to provide or support a means for transmitting, to the UE via the broadcast message, the broadcast message being part of an SSB, an indication of a set of parameters associated with transmitting the request, where receiving the request is based on the indication of the set of parameters. In some examples, the set of parameters include a set of time resources, a set of frequency resources, or both. In some examples, the set of parameters include a time offset associated with transmitting the request, a PRACH preamble associated with the request, a set of RACH occasions for transmitting the request, or any combination thereof. In some examples, the request is received via a PRACH, a PUCCH, a PUSCH, or any combination thereof.

In some examples, the broadcast message transmitting manager 1025 may be configured to provide or support a means for transmitting, to the UE via the broadcast message, an indication of a set of resources usable by the UE for receiving the system information. In some examples, the broadcast message transmitting manager 1025 may be configured to provide or support a means for transmitting, to the UE via the broadcast message, an indication of a periodicity associated with the system information, where transmitting the system information is based on transmitting the indication of the periodicity. In some examples, the system information includes a SIB1.

In some examples, the signaling message transmitting manager 1040 may be configured to provide or support a means for transmitting, to the UE, a signaling message including a configuration for interpreting the indication in the broadcast message, where receiving the request is based on transmitting the signaling message.

In some examples, the broadcast message transmitted to the UE is mapped to pre-configured communications resources for reduced-capability UEs. In some examples, receiving the request is based on transmitting the broadcast message mapped to the pre-configured communications resources for reduced-capability UEs.

In some examples, the reduced-capability UE manager 1045 may be configured to provide or support a means for determining that a quantity of reduced-capability UEs which are in wireless communication with the base station is less than a threshold quantity of reduced-capability UEs. In some examples, the system information transmitting manager 1035 may be configured to provide or support a means for refraining from broadcasting the system information based on determining that the quantity of reduced-capability UEs which are in wireless communication with the base station is less than the threshold quantity of reduced-capability UEs.

Figure 11:
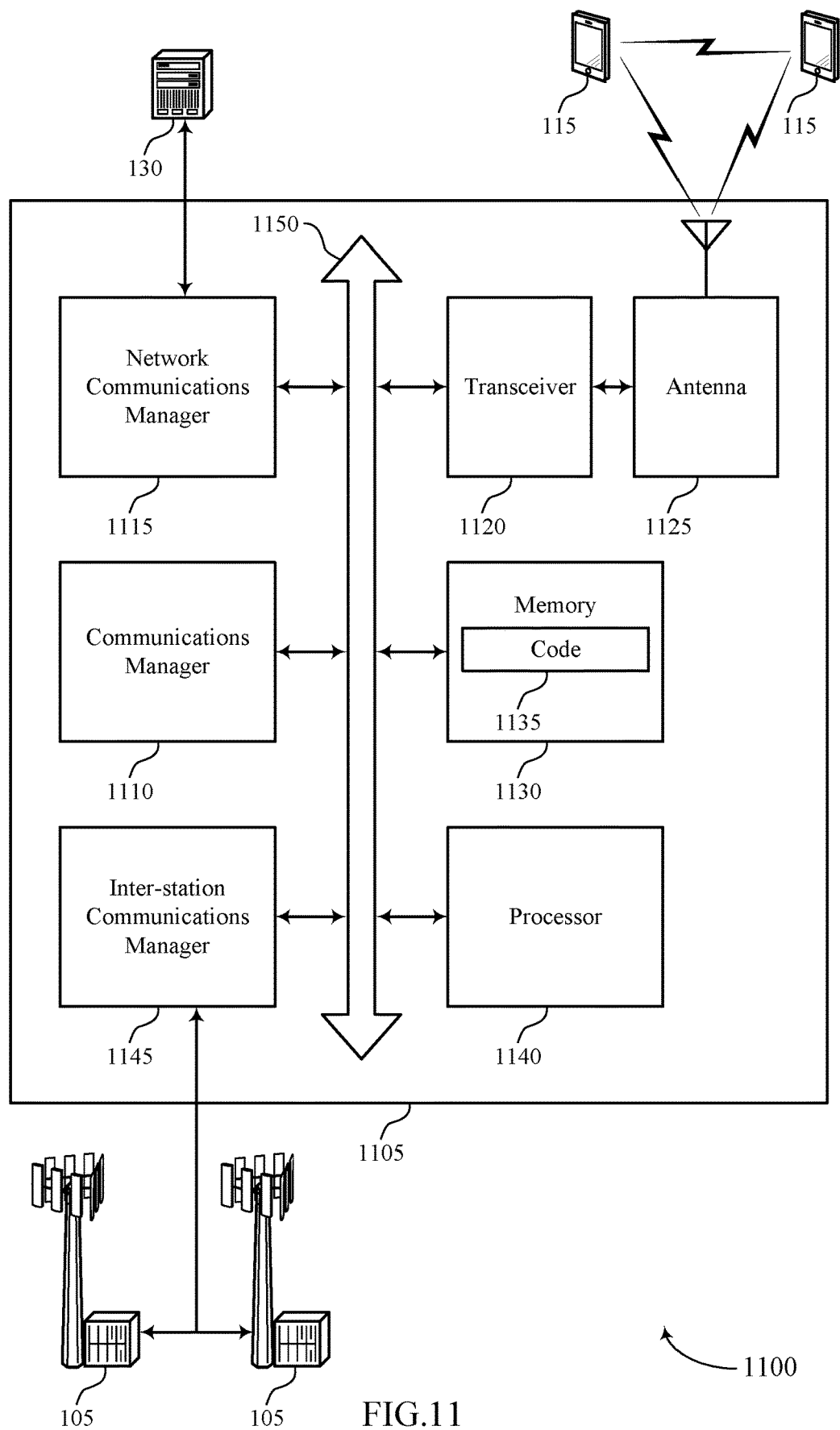
FIG. 11 shows a diagram of a system including a device that supports techniques for on-demand transmission of dedicated reduced-bandwidth system information in accordance with aspects of the present disclosure.

FIG. 11 shows a diagram of a system 1100 including a device 1105 that supports techniques for on-demand transmission of dedicated reduced-bandwidth system information in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, including a communications manager 1110, a network communications manager 1115, a transceiver 1120, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1115 may manage communications with a core network (e.g., via one or more wired backhaul links). For example, the network communications manager 1115 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1120 may communicate bi-directionally, via the one or more antennas 1125, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to one or more antennas 1125 for transmission, and to demodulate packets received from the one or more antennas 1125. The transceiver 1120, or the transceiver 1120 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for on-demand transmission of dedicated reduced-bandwidth system information). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1110 may support wireless communication at a base station in accordance with examples as disclosed herein. For example, the communications manager 1110 may be configured to provide or support a means for transmitting a broadcast message to a UE, the broadcast message including an indication pertaining to system information for reduced-capability UEs including UEs with a bandwidth capability below a threshold, the UE being a reduced-capability UE. The communications manager 1110 may be configured to provide or support a means for transmitting the indication to the UE via the broadcast message, the indication being that system information for reduced-capability UEs is not scheduled to be broadcast by the base station. The communications manager 1110 may be configured to provide or support a means for receiving, from the UE, a request for the system information based on transmission of the indication in the broadcast message. The communications manager 1110 may be configured to provide or support a means for broadcasting the system information based on receiving the request.

By including or configuring the communications manager 1110 in accordance with examples as described herein, the device 1105 may support techniques for on-demand broadcasts of system information for reduced-capability UEs 115, which may reduce signaling overhead and lead to more efficient use of resources within a wireless communications system. In particular, techniques described herein may the base station 105 to transmit system information for reduced-capability UEs 115 on an as-needed basis (e.g., in response to on-demand requests), which may reduce signaling overhead and prevent wasted resources in cases where there are few (or no) reduced-capability UEs 115 which are to receive the system information. Additionally, by enabling the base station 105 to indicate to UEs 115 whether system information is scheduled to be broadcast, techniques described herein may enable the base station 105 to transmit system information for reduced-capability UEs 115 on an as-needed basis, which may reduce power consumption and signaling at the base station 105 which is associated with continuously or regularly broadcasting the system information.

In some examples, the communications manager 1110 may be configured to perform various operations (e.g., receiving, monitoring, transmitting) using or otherwise in cooperation with the transceiver 1120, the one or more antennas 1125, or any combination thereof. Although the communications manager 1110 is illustrated as a separate component, in some examples, one or more functions described with reference to the communications manager 1110 may be supported by or performed by the processor 1140, the memory 1130, the code 1135, or any combination thereof. For example, the code 1135 may include instructions executable by the processor 1140 to cause the device 1105 to perform various aspects of techniques for on-demand transmission of dedicated reduced-bandwidth system information as described herein, or the processor 1140 and the memory 1130 may be otherwise configured to perform or support such operations.

Figure 12:
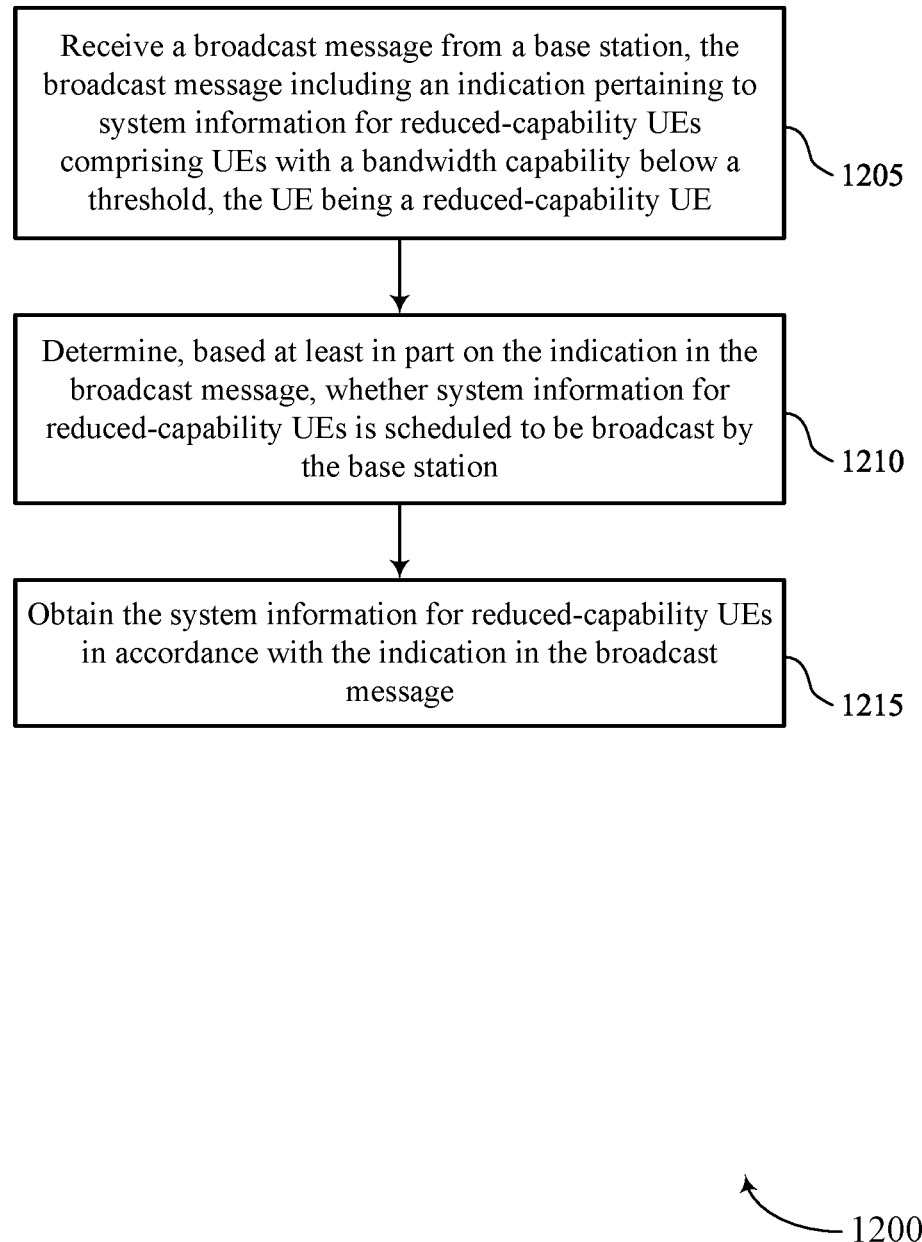
FIGS. 12 through 16 show flowcharts illustrating methods that support techniques for on-demand transmission of dedicated reduced-bandwidth system information in accordance with aspects of the present disclosure.

FIG. 12 shows a flowchart illustrating a method 1200 that supports techniques for on-demand transmission of dedicated reduced-bandwidth system information in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving a broadcast message from a base station, the broadcast message including an indication pertaining to system information for reduced-capability UEs including UEs with a bandwidth capability below a threshold, the UE being a reduced-capability UE. The operations of 1205 may be performed according to the methods described herein. In some examples, aspects of the operations of 1205 may be performed by a broadcast message receiving manager 625 as described with reference to FIG. 6.

At 1210, the method may include determining, based on the indication in the broadcast message, whether system information for reduced-capability UEs is scheduled to be broadcast by the base station. The operations of 1210 may be performed according to the methods described herein. In some examples, aspects of the operations of 1210 may be performed by a system information manager 630 as described with reference to FIG. 6.

At 1215, the method may include obtaining the system information for reduced-capability UEs in accordance with the indication in the broadcast message. The operations of 1215 may be performed according to the methods described herein. In some examples, aspects of the operations of 1215 may be performed by a system information manager 630 as described with reference to FIG. 6.

Figure 13:
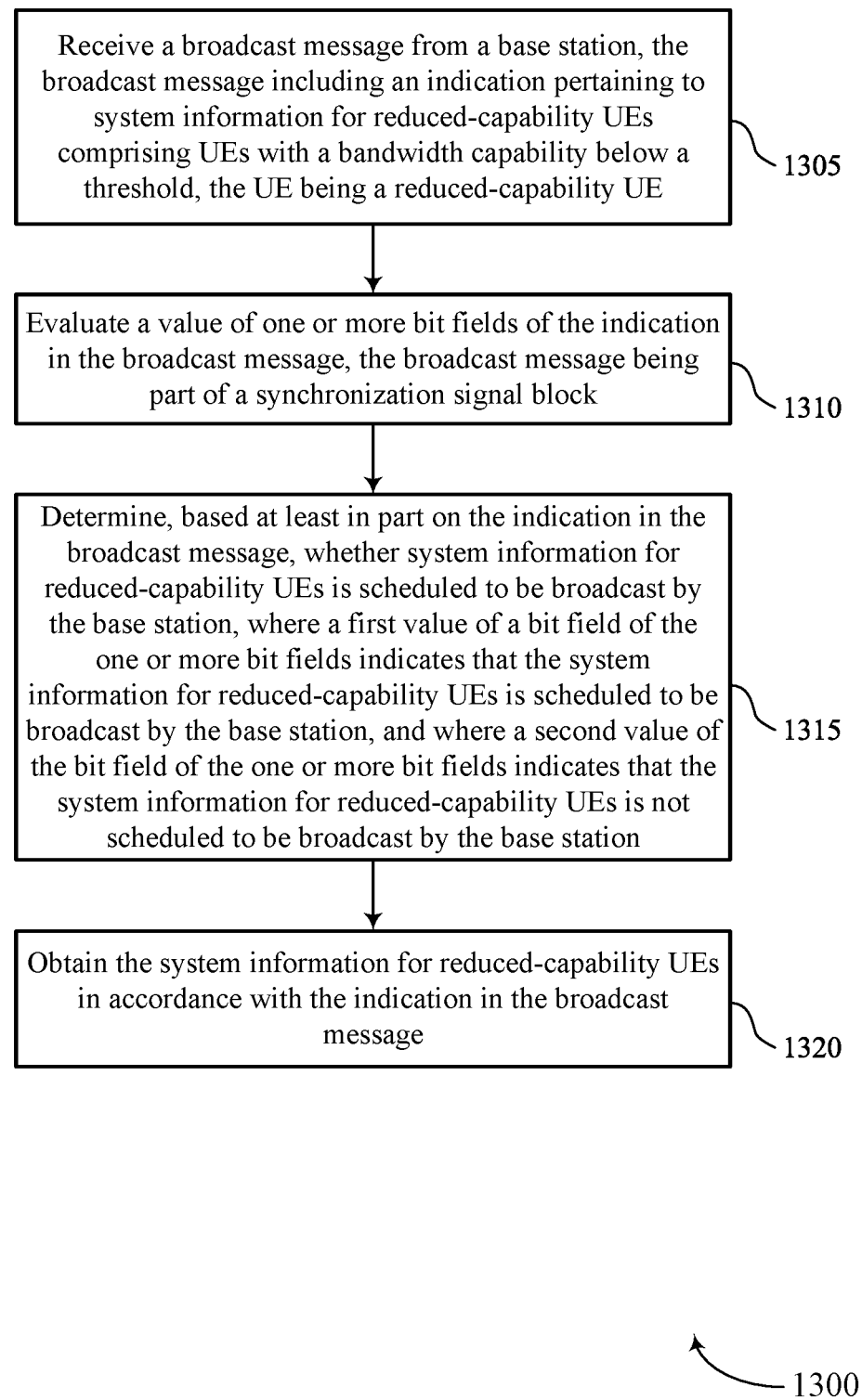

FIG. 13 shows a flowchart illustrating a method 1300 that supports techniques for on-demand transmission of dedicated reduced-bandwidth system information in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving a broadcast message from a base station, the broadcast message including an indication pertaining to system information for reduced-capability UEs including UEs with a bandwidth capability below a threshold, the UE being a reduced-capability UE. The operations of 1305 may be performed according to the methods described herein. In some examples, aspects of the operations of 1305 may be performed by a broadcast message receiving manager 625 as described with reference to FIG. 6.

At 1310, the method may include evaluating a value of one or more bit fields of the indication in the broadcast message, the broadcast message being part of an SSB. The operations of 1310 may be performed according to the methods described herein. In some examples, aspects of the operations of 1310 may be performed by a broadcast message receiving manager 625 as described with reference to FIG. 6.

At 1315, the method may include determining, based on the indication in the broadcast message, whether system information for reduced-capability UEs is scheduled to be broadcast by the base station, where a first value of a bit field of the one or more bit fields indicates that the system information for reduced-capability UEs is scheduled to be broadcast by the base station, and where a second value of the bit field of the one or more bit fields indicates that the system information for reduced-capability UEs is not scheduled to be broadcast by the base station. The operations of 1315 may be performed according to the methods described herein. In some examples, aspects of the operations of 1315 may be performed by a system information manager 630 as described with reference to FIG. 6.

At 1320, the method may include obtaining the system information for reduced-capability UEs in accordance with the indication in the broadcast message. The operations of 1320 may be performed according to the methods described herein. In some examples, aspects of the operations of 1320 may be performed by a system information manager 630 as described with reference to FIG. 6.

Figure 14:
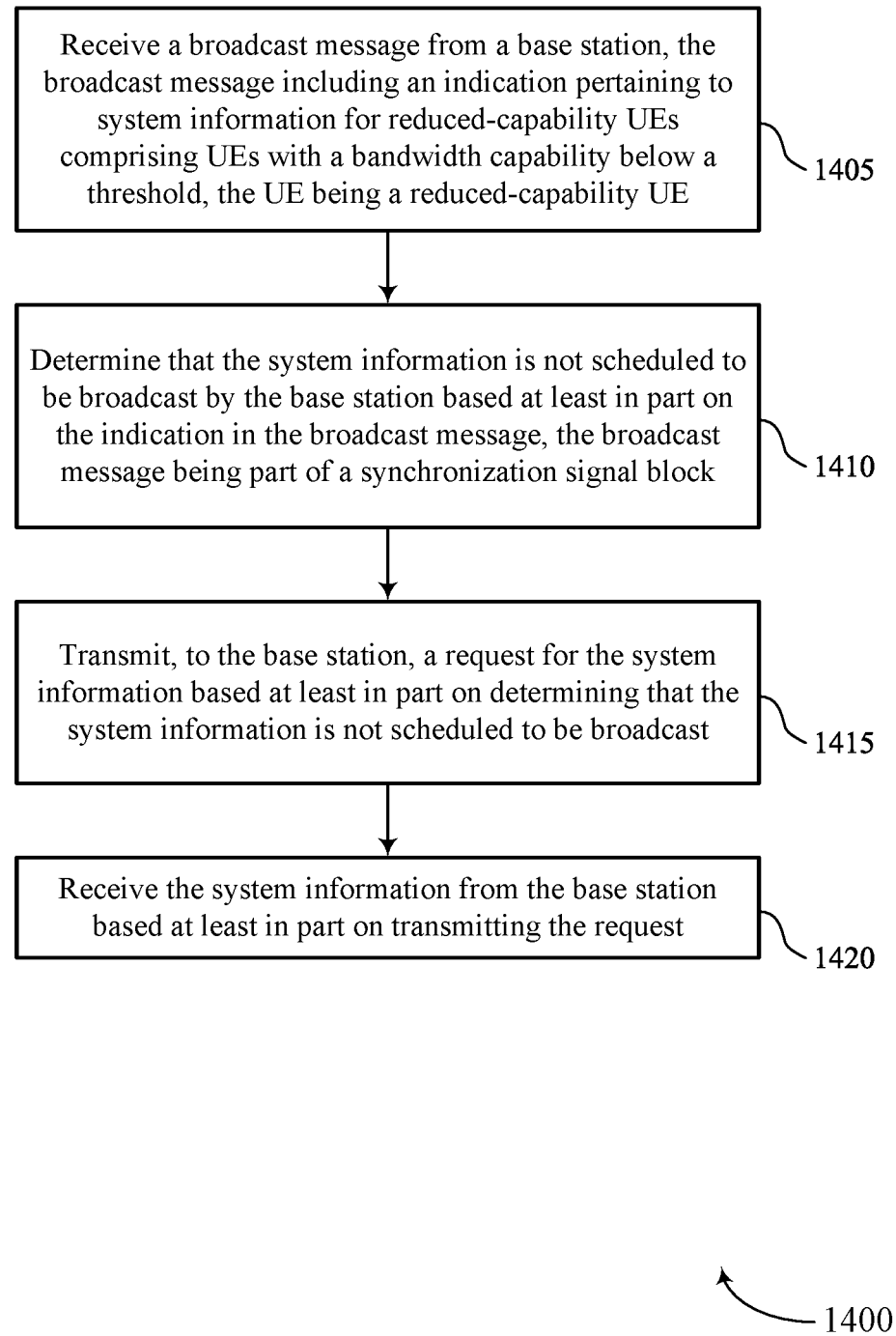

FIG. 14 shows a flowchart illustrating a method 1400 that supports techniques for on-demand transmission of dedicated reduced-bandwidth system information in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include receiving a broadcast message from a base station, the broadcast message including an indication pertaining to system information for reduced-capability UEs including UEs with a bandwidth capability below a threshold, the UE being a reduced-capability UE. The operations of 1405 may be performed according to the methods described herein. In some examples, aspects of the operations of 1405 may be performed by a broadcast message receiving manager 625 as described with reference to FIG. 6.

At 1410, the method may include determining that the system information is not scheduled to be broadcast by the base station based on the indication in the broadcast message, the broadcast message being part of an SSB. The operations of 1410 may be performed according to the methods described herein. In some examples, aspects of the operations of 1410 may be performed by a system information manager 630 as described with reference to FIG. 6.

At 1415, the method may include transmitting, to the base station, a request for the system information based on determining that the system information is not scheduled to be broadcast. The operations of 1415 may be performed according to the methods described herein. In some examples, aspects of the operations of 1415 may be performed by a system information request transmitting manager 635 as described with reference to FIG. 6.

At 1420, the method may include receiving the system information from the base station based on transmitting the request. The operations of 1420 may be performed according to the methods described herein. In some examples, aspects of the operations of 1420 may be performed by a system information receiving manager 640 as described with reference to FIG. 6.

Figure 15:
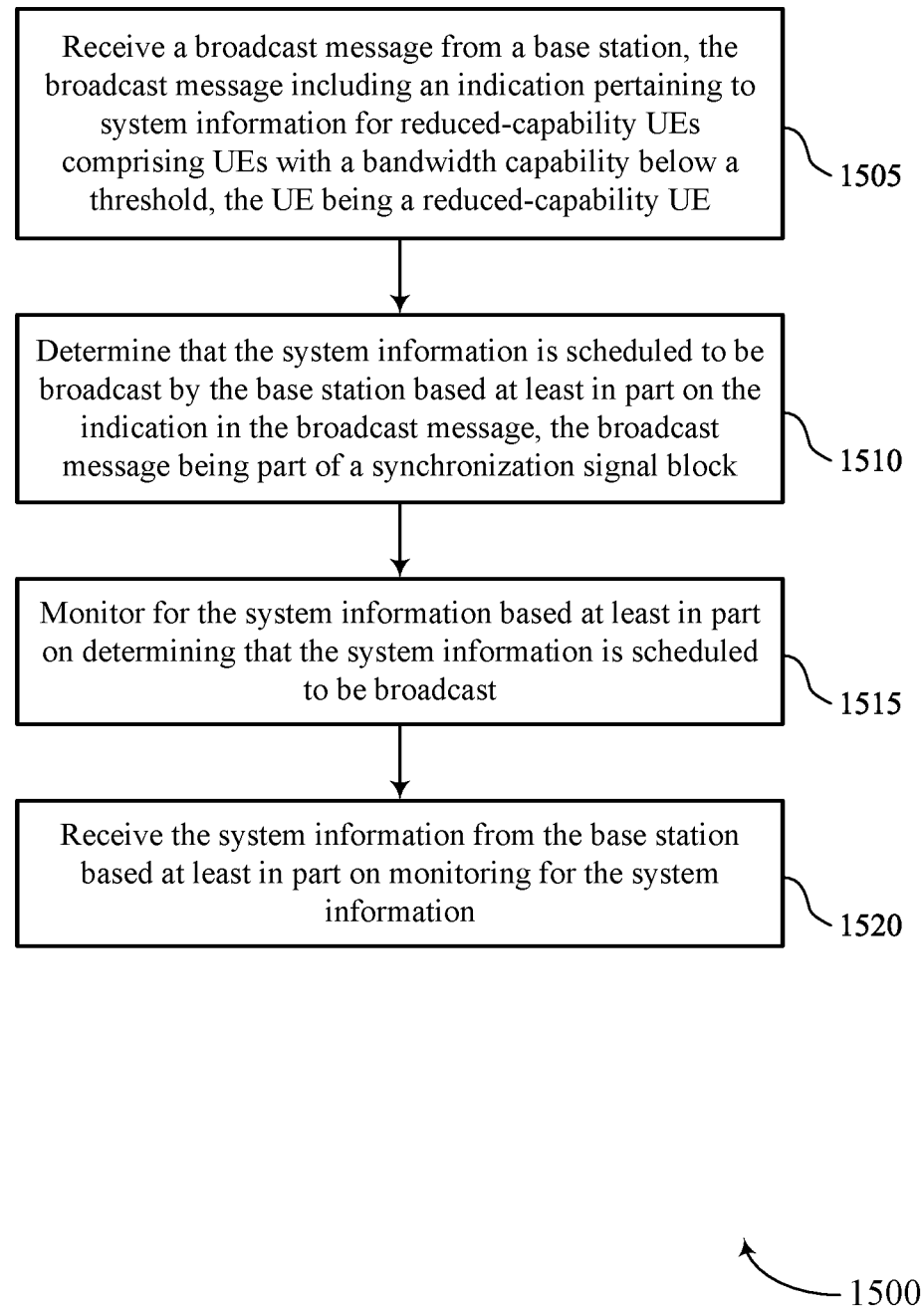

FIG. 15 shows a flowchart illustrating a method 1500 that supports techniques for on-demand transmission of dedicated reduced-bandwidth system information in accordance with aspects of the present disclosure. The operations of the method 1500 may be implemented by a UE or its components as described herein. For example, the operations of the method 1500 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1505, the method may include receiving a broadcast message from a base station, the broadcast message including an indication pertaining to system information for reduced-capability UEs including UEs with a bandwidth capability below a threshold, the UE being a reduced-capability UE. The operations of 1505 may be performed according to the methods described herein. In some examples, aspects of the operations of 1505 may be performed by a broadcast message receiving manager 625 as described with reference to FIG. 6.

At 1510, the method may include determining that the system information is scheduled to be broadcast by the base station based on the indication in the broadcast message, the broadcast message being part of an SSB. The operations of 1510 may be performed according to the methods described herein. In some examples, aspects of the operations of 1510 may be performed by a system information manager 630 as described with reference to FIG. 6.

At 1515, the method may include monitoring for the system information based on determining that the system information is scheduled to be broadcast. The operations of 1515 may be performed according to the methods described herein. In some examples, aspects of the operations of 1515 may be performed by a system information receiving manager 640 as described with reference to FIG. 6.

At 1520, the method may include receiving the system information from the base station based on monitoring for the system information. The operations of 1520 may be performed according to the methods described herein. In some examples, aspects of the operations of 1520 may be performed by a system information receiving manager 640 as described with reference to FIG. 6.

Figure 16:
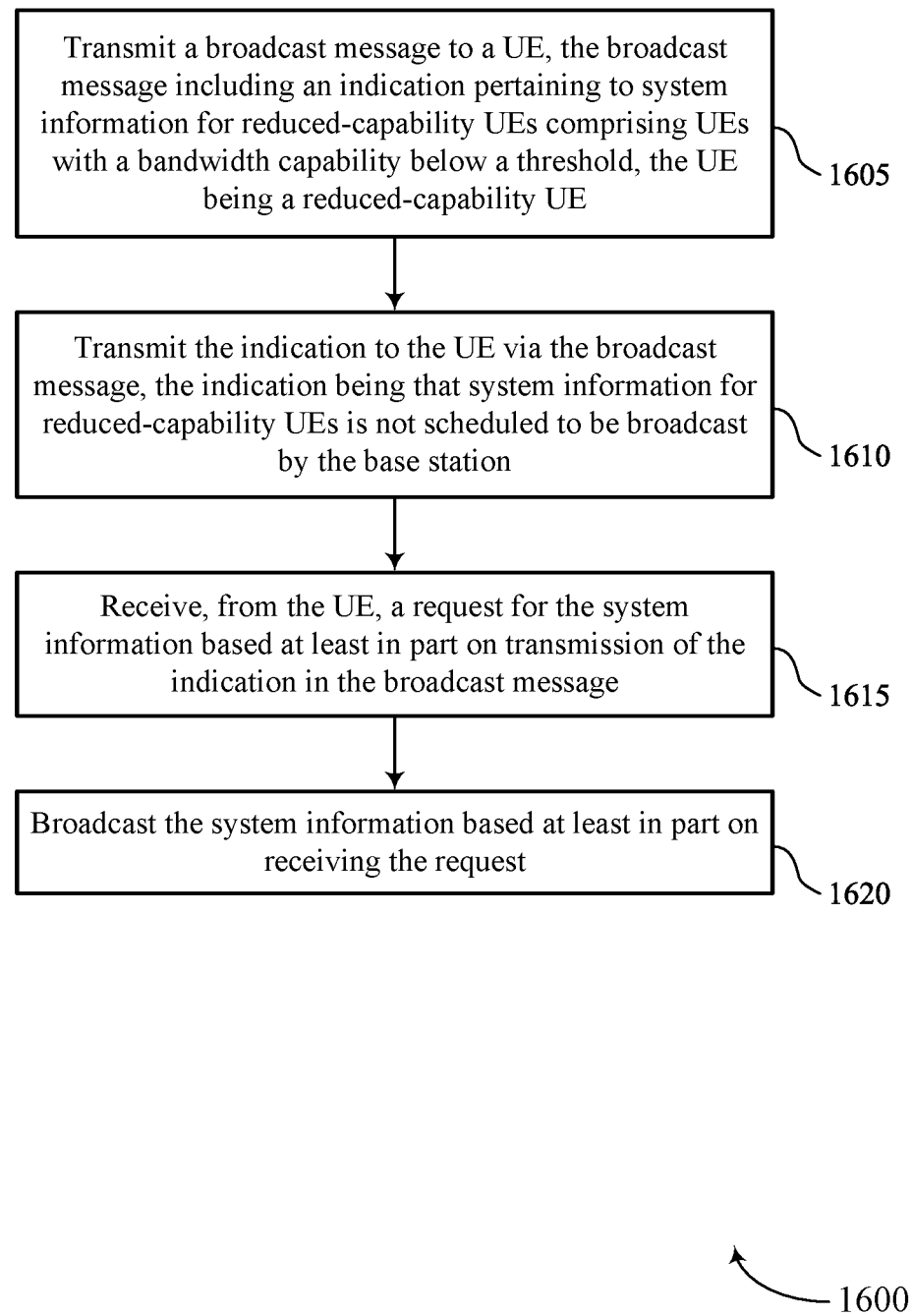

FIG. 16 shows a flowchart illustrating a method 1600 that supports techniques for on-demand transmission of dedicated reduced-bandwidth system information in accordance with aspects of the present disclosure. The operations of the method 1600 may be implemented by a base station or its components as described herein. For example, the operations of the method 1600 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1605, the method may include transmitting a broadcast message to a UE, the broadcast message including an indication pertaining to system information for reduced-capability UEs including UEs with a bandwidth capability below a threshold, the UE being a reduced-capability UE. The operations of 1605 may be performed according to the methods described herein. In some examples, aspects of the operations of 1605 may be performed by a broadcast message transmitting manager 1025 as described with reference to FIG. 10.

At 1610, the method may include transmitting the indication to the UE via the broadcast message, the indication being that system information for reduced-capability UEs is not scheduled to be broadcast by the base station. The operations of 1610 may be performed according to the methods described herein. In some examples, aspects of the operations of 1610 may be performed by a broadcast message transmitting manager 1025 as described with reference to FIG. 10.

At 1615, the method may include receiving, from the UE, a request for the system information based on transmission of the indication in the broadcast message. The operations of 1615 may be performed according to the methods described herein. In some examples, aspects of the operations of 1615 may be performed by a system information request receiving manager 1030 as described with reference to FIG. 10.

At 1620, the method may include broadcasting the system information based on receiving the request. The operations of 1620 may be performed according to the methods described herein. In some examples, aspects of the operations of 1620 may be performed by a system information transmitting manager 1035 as described with reference to FIG. 10.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving a broadcast message from a base station, the broadcast message including an indication pertaining to system information for reduced-capability UEs comprising UEs with a bandwidth capability below a threshold, the UE being a reduced-capability UE; determining, based at least in part on the indication in the broadcast message, whether system information for reduced-capability UEs is scheduled to be broadcast by the base station; and obtaining the system information for reduced-capability UEs in accordance with the indication in the broadcast message.

Aspect 2: The method of aspect 1, wherein determining whether system information for reduced-capability UEs is scheduled to be broadcast comprises: evaluating a value of one or more bit fields of the indication in the broadcast message, the broadcast message being part of an SSB, wherein a first value of a bit field of the one or more bit fields indicates that the system information for reduced-capability UEs is scheduled to be broadcast by the base station, and wherein a second value of the bit field of the one or more bit fields indicates that the system information for reduced-capability UEs is not scheduled to be broadcast by the base station.

Aspect 3: The method of any of aspects 1 through 2, wherein obtaining the system information for reduced-capability UEs comprises: determining that the system information is not scheduled to be broadcast by the base station based at least in part on the indication in the broadcast message, the broadcast message being part of an SSB; transmitting, to the base station, a request for the system information based at least in part on determining that the system information is not scheduled to be broadcast; and receiving the system information from the base station based at least in part on transmitting the request.

Aspect 4: The method of aspect 3, further comprising: determining a set of parameters associated with transmitting the request based at least in part on the indication in the broadcast message, wherein transmitting the request is based at least in part on the determined set of parameters.

Aspect 5: The method of aspect 4, wherein the set of parameters comprise a set of time resources, a set of frequency resources, or both.

Aspect 6: The method of any of aspects 4 through 5, wherein the set of parameters comprise a time offset associated with transmitting the request, a PRACH preamble associated with the request, a set of RACH occasions for transmitting the request, or any combination thereof.

Aspect 7: The method of any of aspects 3 through 6, wherein the request is transmitted via a PRACH, a PUCCH, a PUSCH, or any combination thereof.

Aspect 8: The method of any of aspects 1 through 7, wherein obtaining the system information for reduced-capability UEs comprises: determining that the system information is scheduled to be broadcast by the base station based at least in part on the indication in the broadcast message, the broadcast message being part of an SSB; monitoring for the system information based at least in part on determining that the system information is scheduled to be broadcast; and receiving the system information from the base station based at least in part on monitoring for the system information.

Aspect 9: The method of aspect 8, further comprising: determining a set of resources for receiving the system information based at least in part on the indication in the broadcast message, wherein monitoring for the system information is performed based at least in part on the determined set of resources.

Aspect 10: The method of any of aspects 8 through 9, further comprising: determining a periodicity associated with the system information based at least in part on the indication in the broadcast message, wherein monitoring for the system information is performed based at least in part on the determined periodicity.

Aspect 11: The method of any of aspects 1 through 10, further comprising: receiving, from the base station, a signaling message comprising a configuration for interpreting the indication in the broadcast message, wherein determining whether the system information for reduced-capability UEs is scheduled to be transmitted is based at least in part on receiving the signaling message.

Aspect 12: The method of any of aspects 1 through 11, wherein the broadcast message received from the base station is mapped to pre-configured communications resources for reduced-capability UEs, determining whether the system information for reduced-capability UEs is scheduled to be transmitted is based at least in part on receiving the broadcast message mapped to the pre-configured communications resources for reduced-capability UEs.

Aspect 13: The method of any of aspects 1 through 12, wherein the system information comprises a SIB1.

Aspect 14: The method of any of aspects 1 through 13, wherein transmitting the indication that system information for reduced-capability UEs is not scheduled to be broadcast comprises: transmitting one or more bit fields via the broadcast message, the broadcast message being part of an SSB, wherein a first value of a bit field of the one or more bit fields indicates that the system information for reduced-capability UEs is scheduled to be broadcast by the base station, and wherein a second value of the bit field of the one or more bit fields indicates that the system information for reduced-capability UEs is not scheduled to be broadcast by the base station.

Aspect 15: A method for wireless communication at a base station, comprising: transmitting a broadcast message to a UE, the broadcast message including an indication pertaining to system information for reduced-capability UEs comprising UEs with a bandwidth capability below a threshold, the UE being a reduced-capability UE; transmitting the indication to the UE via the broadcast message, the indication being that system information for reduced-capability UEs is not scheduled to be broadcast by the base station; receiving, from the UE, a request for the system information based at least in part on transmission of the indication in the broadcast message; and broadcasting the system information based at least in part on receiving the request.

Aspect 16: The method of aspect 15, further comprising: transmitting, to the UE via the broadcast message, the broadcast message being part of an SSB, an indication of a set of parameters associated with transmitting the request, wherein receiving the request is based at least in part on the indication of the set of parameters.

Aspect 17: The method of aspect 16, wherein the set of parameters comprise a set of time resources, a set of frequency resources, or both.

Aspect 18: The method of any of aspects 16 through 17, wherein the set of parameters comprise a time offset associated with transmitting the request, a PRACH preamble associated with the request, a set of RACH occasions for transmitting the request, or any combination thereof.

Aspect 19: The method of any of aspects 15 through 18, wherein the request is received via a PRACH, a PUCCH, a PUSCH, or any combination thereof.

Aspect 20: The method of any of aspects 15 through 19, further comprising: transmitting, to the UE via the broadcast message, an indication of a set of resources usable by the UE for receiving the system information.

Aspect 21: The method of any of aspects 15 through 20, further comprising: transmitting, to the UE via the broadcast message, an indication of a periodicity associated with the system information, wherein transmitting the system information is based at least in part on transmitting the indication of the periodicity.

Aspect 22: The method of any of aspects 15 through 21, further comprising: transmitting, to the UE, a signaling message comprising a configuration for interpreting the indication in the broadcast message, wherein receiving the request is based at least in part on transmitting the signaling message.

Aspect 23: The method of any of aspects 15 through 22, wherein the broadcast message transmitted to the UE is mapped to pre-configured communications resources for reduced-capability UEs, receiving the request is based at least in part on transmitting the broadcast message mapped to the pre-configured communications resources for reduced-capability UEs.

Aspect 24: The method of any of aspects 15 through 23, wherein the system information comprises a SIB1.

Aspect 25: The method of any of aspects 15 through 24, further comprising: determining that a quantity of reduced-capability UEs which are in wireless communication with the base station is less than a threshold quantity of reduced-capability UEs; and refraining from broadcasting the system information based at least in part on determining that the quantity of reduced-capability UEs which are in wireless communication with the base station is less than the threshold quantity of reduced-capability UEs.

Aspect 26: A method for wireless communication at a UE, comprising: receiving a broadcast message from a base station, the broadcast message including an indication pertaining to system information for reduced-capability UEs comprising UEs with a bandwidth capability below a threshold, the UE being a reduced-capability UE; determining, based at least in part on the indication in the broadcast message, whether system information for reduced-capability UEs is scheduled to be broadcast by the base station; and obtaining the system information for reduced-capability UEs in accordance with the indication in the broadcast message.

Aspect 27: The method of aspect 26, wherein the broadcast message is received via a first cell supported by the base station, the method further comprising: determining that reduced-capability UEs are not allowed to access the first cell based at least in part on access control information of the broadcast message, access barring information of the broadcast message, or both; performing a cell reselection procedure with a second cell different from the first cell based at least in part on determining that reduced-capability UEs are not allowed to access the first cell; receiving an additional broadcast message from the base station via the second cell based at least in part on performing the cell reselection procedure, the broadcast message including a second indication pertaining to system information for reduced-capability UEs; and obtaining the system information in accordance with the second indication.

Aspect 28: The method of any of aspects 26 through 27, wherein the broadcast message is received via a first cell supported by the base station, the method further comprising: determining that reduced-capability UEs are allowed to access the first cell based at least in part on access control information of the broadcast message, access barring information of the broadcast message, or both; and evaluating a value of one or more bit fields of the indication in the broadcast message, wherein a first value of a bit field of the one or more bit fields indicates that the system information for reduced-capability UEs is scheduled to be broadcast by the base station, and wherein a second value of the bit field of the one or more bit fields indicates that the system information for reduced-capability UEs is not scheduled to be broadcast by the base station.

Aspect 29: The method of aspect 28, further comprising: determining that the system information is not scheduled to be broadcast by the base station and that the system information may be requested by reduced-capability UEs based at least in part on the indication in the broadcast message, the broadcast message being part of an SSB transmitted within a bandwidth capable of being received by reduced-capability UEs; transmitting, to the base station, a request for the system information based at least in part on determining that the system information is not scheduled to be broadcast and that the system information may be requested by reduced-capability UEs; and receiving the system information from the base station based at least in part on transmitting the request.

Aspect 30: The method of aspect 29, wherein receiving the system information comprises: receiving the system information which is quasi co-located with an SSB received from the base station, an additional broadcast message received from the base station, or both, wherein the system information is received based at least in part on transmitting the request via a pre-configured uplink resource associated with one or more beams for broadcasting system information.

Aspect 31: The method of any of aspects 29 through 30, further comprising: determining a set of parameters associated with transmitting the request based at least in part on the indication in the broadcast message pertaining to the system information for reduced-capability UEs, wherein transmitting the request is based at least in part on the determined set of parameters and based at least in part on the broadcast message being received within a bandwidth associated with reduced-capability UEs, non-reduced-capability UEs, or both.

Aspect 32: The method of aspect 31, wherein the set of parameters comprise a set of time resources, a set of frequency resources, a set of sequences, or any combination thereof.

Aspect 33: The method of any of aspects 28 through 32, wherein the request is transmitted via a PRACH, a PUCCH, a PUSCH, or any combination thereof.

Aspect 34: The method of any of aspects 26 through 33, wherein the broadcast message is received via a first cell supported by the base station, and wherein obtaining the system information for reduced-capability UEs comprises: determining that reduced-capability UEs are allowed to access the first cell based at least in part on the broadcast message; determining that the system information is scheduled to be broadcast by the base station based at least in part on the indication in the broadcast message, the broadcast message being part of an SSB; monitoring for the system information based at least in part on determining that the system information is scheduled to be broadcast; and receiving the system information from the base station based at least in part on monitoring for the system information.

Aspect 35: The method of aspect 34, further comprising: transmitting, to the base station, a request for the system information, wherein the monitoring is based at least in part on transmitting the request; and determining that the system information is scheduled to be broadcast by the base station based at least in part on a random access response received in response to the request, a paging message for system information updates for the first cell received in response to the request, or both.

Aspect 36: The method of any of aspects 34 through 35, further comprising: determining a set of resources for receiving the system information based at least in part on the indication in the broadcast message, wherein monitoring for the system information is performed based at least in part on the determined set of resources.

Aspect 37: The method of any of aspects 34 through 36, further comprising: determining a periodicity associated with the system information based at least in part on the indication in the broadcast message, wherein monitoring for the system information is performed based at least in part on the determined periodicity.

Aspect 38: The method of any of aspects 26 through 37, further comprising: receiving, from the base station, a signaling message comprising a configuration for interpreting the indication in the broadcast message, wherein determining whether the system information for reduced-capability UEs is scheduled to be transmitted is based at least in part on receiving the signaling message.

Aspect 39: The method of any of aspects 26 through 38, wherein the broadcast message received from the base station is mapped to pre-configured communications resources for reduced-capability UEs, determining whether the system information for reduced-capability UEs is scheduled to be transmitted is based at least in part on receiving the broadcast message mapped to the pre-configured communications resources for reduced-capability UEs.

Aspect 40: The method of any of aspects 26 through 39, wherein the system information for reduced-capability UEs comprises a SIB1 system information block which is quasi co-located with a subset of SSB beams used for communications at the base station, the subset of SSB beams are associated with requests for the system information transmitted to the base station by reduced-capability UEs.

Aspect 41: A method for wireless communication at a base station, comprising: transmitting a broadcast message to a UE, the broadcast message including an indication pertaining to system information for reduced-capability UEs comprising UEs with a bandwidth capability below a threshold, the UE being a reduced-capability UE; transmitting the indication to the UE via the broadcast message, the indication being that system information for reduced-capability UEs is not scheduled to be broadcast by the base station; receiving, from the UE, a request for the system information based at least in part on transmission of the indication in the broadcast message; and broadcasting the system information based at least in part on receiving the request.

Aspect 42: The method of aspect 41, further comprising: determining that a quantity of reduced-capability UEs which are in wireless communication with the base station is less than a threshold quantity of reduced-capability UEs; and refraining from broadcasting the system information based at least in part on determining that the quantity of reduced-capability UEs which are in wireless communication with the base station is less than the threshold quantity of reduced-capability UEs.

Aspect 43: An apparatus for wireless communication at a UE, comprising a processor; memory coupled with the processor; and instructions stored in the memory and executable by the processor to cause the apparatus to perform a method of any of aspects 1 through 14.

Aspect 44: An apparatus for wireless communication at a UE, comprising at least one means for performing a method of any of aspects 1 through 14.

Aspect 45: A non-transitory computer-readable medium storing code for wireless communication at a UE, the code comprising instructions executable by a processor to perform a method of any of aspects 1 through 14.

Aspect 46: An apparatus for wireless communication at a base station, comprising a processor; memory coupled with the processor; and instructions stored in the memory and executable by the processor to cause the apparatus to perform a method of any of aspects 15 through 25.

Aspect 47: An apparatus for wireless communication at a base station, comprising at least one means for performing a method of any of aspects 15 through 25.

Aspect 48: A non-transitory computer-readable medium storing code for wireless communication at a base station, the code comprising instructions executable by a processor to perform a method of any of aspects 15 through 25.

Aspect 49: An apparatus for wireless communication at a UE, comprising a processor; memory coupled with the processor; and instructions stored in the memory and executable by the processor to cause the apparatus to perform a method of any of aspects 26 through 40.

Aspect 50: An apparatus for wireless communication at a UE, comprising at least one means for performing a method of any of aspects 26 through 40.

Aspect 51: A non-transitory computer-readable medium storing code for wireless communication at a UE, the code comprising instructions executable by a processor to perform a method of any of aspects 26 through 40.

Aspect 52: An apparatus for wireless communication at a base station, comprising a processor; memory coupled with the processor; and instructions stored in the memory and executable by the processor to cause the apparatus to perform a method of any of aspects 41 through 42.

Aspect 53: An apparatus for wireless communication at a base station, comprising at least one means for performing a method of any of aspects 41 through 42.

Aspect 54: A non-transitory computer-readable medium storing code for wireless communication at a base station, the code comprising instructions executable by a processor to perform a method of any of aspects 41 through 42.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a broadcast message from a base station, the broadcast message including an indication pertaining to system information for reduced-capability UEs comprising UEs with a bandwidth capability below a threshold, the UE being a reduced-capability UE;
   determining, based at least in part on the indication in the broadcast message, whether system information for reduced-capability UEs is scheduled to be broadcast by the base station;
   obtaining the system information for reduced-capability UEs in accordance with the indication in the broadcast message;
   wherein the broadcast message is received via a first cell supported by the base station, the method further comprising:
   determining that reduced-capability UEs are allowed to access the first cell based at least in part on access control information of the broadcast message, access barring information of the broadcast message, or both; and
   evaluating a value of one or more bit fields of the indication in the broadcast message, wherein a first value of a bit field of the one or more bit fields indicates that the system information for reduced-capability UEs is scheduled to be broadcast by the base station, and wherein a second value of the bit field of the one or more bit fields indicates that the system information for reduced-capability UEs is not scheduled to be broadcast by the base station.

2. The method of claim 1, further comprising:
   determining that the system information is not scheduled to be broadcast by the base station and that the system information may be requested by reduced-capability UEs based at least in part on the indication in the broadcast message, the broadcast message being part of a synchronization signal block transmitted within a bandwidth capable of being received by reduced-capability UEs;
   transmitting, to the base station, a request for the system information based at least in part on determining that the system information is not scheduled to be broadcast and that the system information may be requested by reduced-capability UEs; and
   receiving the system information from the base station based at least in part on transmitting the request.

3. The method of claim 2, wherein receiving the system information comprises:
   receiving the system information which is quasi co-located with a synchronization signal block received from the base station, an additional broadcast message received from the base station, or both, wherein the system information is received based at least in part on transmitting the request via a pre-configured uplink resource associated with one or more beams for broadcasting system information.

4. The method of claim 2, further comprising:
determining a set of parameters associated with transmitting the request based at least in part on the indication in the broadcast message pertaining to the system information for reduced-capability UEs, wherein transmitting the request is based at least in part on the determined set of parameters and based at least in part on the broadcast message being received within a bandwidth associated with reduced-capability UEs, non-reduced-capability UEs, or both.

5. The method of claim 4, wherein the set of parameters comprise a set of time resources, a set of frequency resources, a set of sequences, or any combination thereof.

6. The method of claim 1, wherein the request is transmitted via a physical random access channel, a physical uplink control channel, a physical uplink shared channel, or any combination thereof.

7. The method of claim 1, wherein the broadcast message received from the base station is mapped to pre-configured communications resources for reduced-capability UEs, wherein determining whether the system information for reduced-capability UEs is scheduled to be transmitted is based at least in part on receiving the broadcast message mapped to the pre-configured communications resources for reduced-capability UEs.

8. The method of claim 1, wherein the system information for reduced-capability UEs comprises a SIB1 system information block which is quasi co-located with a subset of synchronization signal block beams used for communications at the base station, wherein the subset of synchronization signal block beams are associated with requests for the system information transmitted to the base station by reduced-capability UEs.

9. A method for wireless communication at a user equipment (UE), comprising:
receiving a broadcast message from a base station, the broadcast message including an indication pertaining to system information for reduced-capability UEs comprising UEs with a bandwidth capability below a threshold, the UE being a reduced-capability UE;
determining, based at least in part on the indication in the broadcast message, whether system information for reduced-capability UEs is scheduled to be broadcast by the base station;
obtaining the system information for reduced-capability UEs in accordance with the indication in the broadcast message;
wherein the broadcast message is received via a first cell supported by the base station, the method further comprising:
determining that reduced-capability UEs are not allowed to access the first cell based at least in part on access control information of the broadcast message, access barring information of the broadcast message, or both;
performing a cell reselection procedure with a second cell different from the first cell based at least in part on determining that reduced-capability UEs are not allowed to access the first cell;
receiving an additional broadcast message from the base station via the second cell based at least in part on performing the cell reselection procedure, the broadcast message including a second indication pertaining to system information for reduced-capability UEs; and
obtaining the system information in accordance with the second indication.

10. A method for wireless communication at a user equipment (UE), comprising:
receiving a broadcast message from a base station, the broadcast message including an indication pertaining to system information for reduced-capability UEs comprising UEs with a bandwidth capability below a threshold, the UE being a reduced-capability UE;
determining, based at least in part on the indication in the broadcast message, whether system information for reduced-capability UEs is scheduled to be broadcast by the base station;
obtaining the system information for reduced-capability UEs in accordance with the indication in the broadcast message;
wherein the broadcast message is received via a first cell supported by the base station, and wherein obtaining the system information for reduced-capability UEs comprises:
determining that reduced-capability UEs are allowed to access the first cell based at least in part on the broadcast message; determining that the system information is scheduled to be broadcast by the base station based at least in part on the indication in the broadcast message, the broadcast message being part of a synchronization signal block;
monitoring for the system information based at least in part on determining that the system information is scheduled to be broadcast; and
receiving the system information from the base station based at least in part on monitoring for the system information.

11. The method of claim 10, further comprising:
transmitting, to the base station, a request for the system information, wherein the monitoring is based at least in part on transmitting the request; and
determining that the system information is scheduled to be broadcast by the base station based at least in part on a random access response received in response to the request, a paging message for system information updates for the first cell received in response to the request, or both.

12. The method of claim 10, further comprising:
determining a set of resources for receiving the system information based at least in part on the indication in the broadcast message, wherein monitoring for the system information is performed based at least in part on the determined set of resources.

13. The method of claim 10, further comprising:
determining a periodicity associated with the system information based at least in part on the indication in the broadcast message, wherein monitoring for the system information is performed based at least in part on the determined periodicity.

14. A method for wireless communication at a base station, comprising:
transmitting a broadcast message to a user equipment (UE), the broadcast message including an indication pertaining to system information for reduced-capability UEs comprising UEs with a bandwidth capability below a threshold, the UE being a reduced-capability UE;
transmitting the indication to the UE via the broadcast message, the indication being that system information for reduced-capability UEs is not scheduled to be broadcast by the base station;

receiving, from the UE, a request for the system information based at least in part on transmission of the indication in the broadcast message;

broadcasting the system information based at least in part on receiving the request;

determining that a quantity of reduced-capability UEs which are in wireless communication with the base station is less than a threshold quantity of reduced-capability UEs; and refraining from broadcasting the system information based at least in part on determining that the quantity of reduced-capability UEs which are in wireless communication with the base station is less than the threshold quantity of reduced-capability UEs.

15. An apparatus for wireless communication at a user equipment (UE), comprising:

a processor;

memory coupled with the processor; and instructions stored in the memory and executable by the processor to cause the apparatus to:

receive a broadcast message from a base station, the broadcast message including an indication pertaining to system information for reduced-capability UEs comprising UEs with a bandwidth capability below a threshold, the UE being a reduced-capability UE;

determine, based at least in part on the indication in the broadcast message, whether system information for reduced-capability UEs is scheduled to be broadcast by the base station;

obtain the system information for reduced-capability UEs in accordance with the indication in the broadcast message;

wherein the broadcast message is received via a first cell supported by the base station, wherein the instructions are further executable by the processor to cause the apparatus to:

determine that reduced-capability UEs are allowed to access the first cell based at least in part on access control information of the broadcast message, access barring information of the broadcast message, or both; and evaluate a value of one or more bit fields of the indication in the broadcast message, wherein a first value of a bit field of the one or more bit fields indicates that the system information for reduced-capability UEs is scheduled to be broadcast by the base station, and wherein a second value of the bit field of the one or more bit fields indicates that the system information for reduced-capability UEs is not scheduled to be broadcast by the base station.

16. The apparatus of claim 15, wherein the instructions are further executable by the processor to cause the apparatus to:

determine that the system information is not scheduled to be broadcast by the base station and that the system information may be requested by reduced-capability UEs based at least in part on the indication in the broadcast message, the broadcast message being part of a synchronization signal block transmitted within a bandwidth capable of being received by reduced-capability UEs;

transmit, to the base station, a request for the system information based at least in part on determining that the system information is not scheduled to be broadcast and that the system information may be requested by reduced-capability UEs; and receive the system information from the base station based at least in part on transmitting the request.

17. The apparatus of claim 16, wherein the instructions to receive the system information are further executable by the processor to cause the apparatus to:

receive the system information which is quasi co-located with a synchronization signal block received from the base station, an additional broadcast message received from the base station, or both, wherein the system information is received based at least in part on transmitting the request via a pre-configured uplink resource associated with one or more beams for broadcasting system information.

18. The apparatus of claim 15, wherein the instructions are further executable by the processor to cause the apparatus to:

determine a set of parameters associated with transmitting the request based at least in part on the indication in the broadcast message pertaining to the system information for reduced-capability UEs, wherein transmitting the request is based at least in part on the determined set of parameters and based at least in part on the broadcast message being received within a bandwidth associated with reduced-capability UEs, non-reduced-capability UEs, or both.

19. The apparatus of claim 18, wherein the set of parameters comprise a set of time resources, a set of frequency resources, a set of sequences, or any combination thereof.

20. The apparatus of claim 15, wherein the request is transmitted via a physical random access channel, a physical uplink control channel, a physical uplink shared channel, or any combination thereof.

21. An apparatus for wireless communication at a user a processor;

memory coupled with the processor; and equipment (UE), comprising:

instructions stored in the memory and executable by the processor to cause the apparatus to:

receive a broadcast message from a base station, the broadcast message including an indication pertaining to system information for reduced-capability UEs comprising UEs with a bandwidth capability below a threshold, the UE being a reduced-capability UE;

determine, based at least in part on the indication in the broadcast message, whether system information for reduced-capability UEs is scheduled to be broadcast by the base station;

obtain the system information for reduced-capability UEs in accordance with the indication in the broadcast message;

wherein the broadcast message is received via a first cell supported by the base station, wherein the instructions are further executable by the processor to cause the apparatus to:

determine that reduced-capability UEs are not allowed to access the first cell based at least in part on access control information of the broadcast message, access barring information of the broadcast message, or both;

perform a cell reselection procedure with a second cell different from the first cell based at least in part on determining that reduced-capability UEs are not allowed to access the first cell;

receive an additional broadcast message from the base station via the second cell based at least in part on performing the cell reselection procedure, the broadcast message including a second indication pertaining to system information for reduced-capability UEs; and obtain the system information in accordance with the second indication.

22. An apparatus for wireless communication at a user equipment (UE), comprising:
a processor;
memory coupled with the processor; and
instructions stored in the memory and executable by the processor to cause the apparatus to:
receive a broadcast message from a base station, the broadcast message including an indication pertaining to system information for reduced-capability UEs comprising UEs with a bandwidth capability below a threshold, the UE being a reduced-capability UE;
determine, based at least in part on the indication in the broadcast message, whether system information for reduced-capability UEs is scheduled to be broadcast by the base station;
obtain the system information for reduced-capability UEs in accordance with the indication in the broadcast message;
wherein the broadcast message is received via a first cell supported by the base station, and wherein the instructions to obtain the system information for reduced-capability UEs are executable by the processor to cause the apparatus to:
determine that reduced-capability UEs are allowed to access the first cell based at least in part on the broadcast message;
determine that the system information is scheduled to be broadcast by the base station based at least in part on the indication in the broadcast message, the broadcast message being part of a synchronization signal block;
monitor for the system information based at least in part on determining that the system information is scheduled to be broadcast; and
receive the system information from the base station based at least in part on monitoring for the system information.

23. The apparatus of claim 22, wherein the instructions are further executable by the processor to cause the apparatus to:
transmit, to the base station, a request for the system information, wherein the monitoring is based at least in part on transmitting the request; and
determine that the system information is scheduled to be broadcast by the base station based at least in part on a random access response received in response to the request, a paging message for system information updates for the first cell received in response to the request, or both.

24. The apparatus of claim 22, wherein the instructions are further executable by the processor to cause the apparatus to:
determine a set of resources for receiving the system information based at least in part on the indication in the broadcast message, wherein monitoring for the system information is performed based at least in part on the determined set of resources.

25. An apparatus for wireless communication at a base station, comprising:
a processor;
memory coupled with the processor; and
instructions stored in the memory and executable by the processor to cause the apparatus to:
transmit a broadcast message to a user equipment (UE), the broadcast message including an indication pertaining to system information for reduced-capability UEs comprising UEs with a bandwidth capability below a threshold, the UE being a reduced-capability UE;
transmit the indication to the UE via the broadcast message, the indication being that system information for reduced-capability UEs is not scheduled to be broadcast by the base station;
receive, from the UE, a request for the system information based at least in part on transmission of the indication in the broadcast message;
broadcast the system information based at least in part on receiving the request;
determine that a quantity of reduced-capability UEs which are in wireless communication with the base station is less than a threshold quantity of reduced-capability UEs; and
refrain from broadcasting the system information based at least in part on determining that the quantity of reduced-capability UEs which are in wireless communication with the base station is less than the threshold quantity of reduced-capability UEs.

* * * * *